United States Patent
Zhang et al.

(10) Patent No.: US 8,755,756 B1
(45) Date of Patent: Jun. 17, 2014

(54) ACTIVE CANCELLATION OF INTERFERENCE IN A WIRELESS COMMUNICATION SYSTEM

(75) Inventors: Ning Zhang, Saratoga, CA (US); David Kuochieh Su, Cupertino, CA (US); William J. McFarland, Los Altos, CA (US); Chin-Hung Chen, Tainan (TW)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 12/769,536

(22) Filed: Apr. 28, 2010

Related U.S. Application Data

(60) Provisional application No. 61/173,910, filed on Apr. 29, 2009.

(51) Int. Cl.
*H04B 1/04* (2006.01)
(52) U.S. Cl.
USPC .................. 455/114.2; 455/67.13; 455/115.1
(58) Field of Classification Search
USPC ...................... 455/67.11–67.16, 114.1–114.2, 455/115.1–115.4
See application file for complete search history.

(56) References Cited

U.S. PATENT DOCUMENTS

| | | | |
|---|---|---|---|
| 6,801,581 B1 | 10/2004 | Francos et al. | |
| 8,055,235 B1 * | 11/2011 | Gupta et al. | 455/296 |
| 2003/0054788 A1 * | 3/2003 | Sugar et al. | 455/323 |
| 2004/0136470 A1 | 7/2004 | DeBruyn et al. | |
| 2008/0146183 A1 * | 6/2008 | Gebara et al. | 455/295 |
| 2009/0262788 A1 * | 10/2009 | Yang et al. | 375/141 |
| 2010/0227570 A1 * | 9/2010 | Hendin | 455/78 |

FOREIGN PATENT DOCUMENTS

| | | |
|---|---|---|
| EP | 0 998 026 A1 | 5/2000 |
| WO | WO2008049310 A1 | 5/2008 |

\* cited by examiner

*Primary Examiner* — Christian Hannon
(74) *Attorney, Agent, or Firm* — Bever, Hoffman & Harms, LLP

(57) ABSTRACT

Various methods and corresponding active interference cancellation units are described. These methods and units can perform active interference cancellation in a system including multiple radios. Notably, signals from a first radio can be received as interference at a second radio. The described methods and units can provide interference conditioning, which manipulates an interference reference of the interference at the first radio to approximate an interference observed at the second radio. After tuning of the interference conditioning, the interference can be removed.

22 Claims, 26 Drawing Sheets

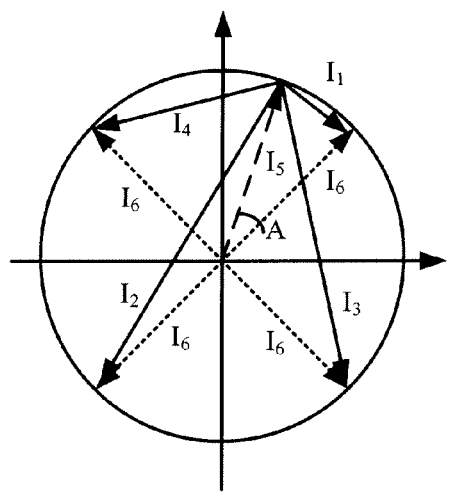
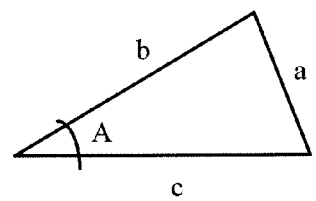
FIG. 9A
FIG. 9D
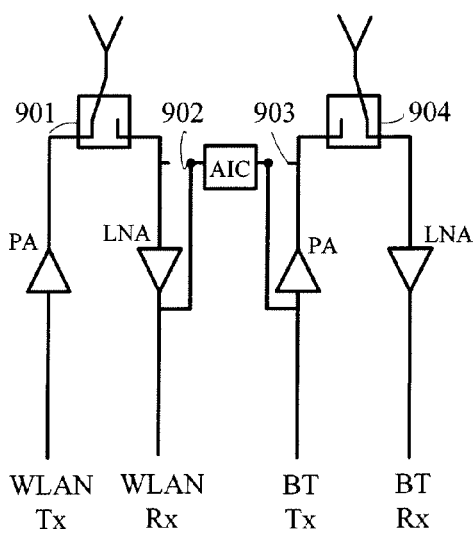
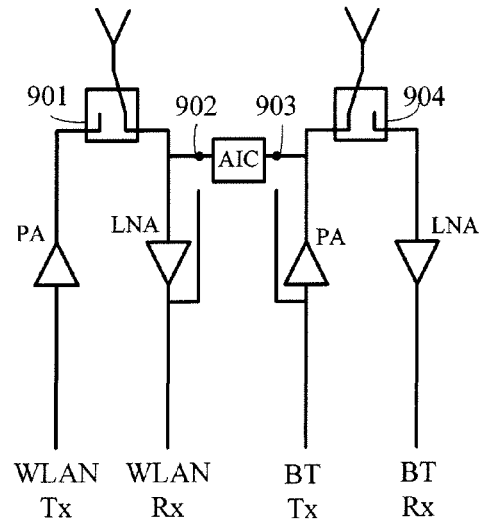
FIG. 9B
FIG. 9C

ACTIVE CANCELLATION OF INTERFERENCE IN A WIRELESS COMMUNICATION SYSTEM

RELATED APPLICATIONS

This application claims priority of U.S. Provisional Patent Application 61/173,910, entitled "Active Cancellation To Improve Coexistence" filed Apr. 29, 2009.

BACKGROUND OF THE INVENTION

1. Field of the Invention

The present invention relates to wireless communication systems and in particular to the active cancellation of interference in these wireless communication systems.

2. Related Art

Active cancellation is a technology where known interference can be subtracted from a signal composed of a desired signal and interference, thereby improving the desired signal quality. In one case, the interference of specific interest is at radio frequency. For example, in a system where multiple radios co-exist, the transmission from one radio can be received as a very strong interference at other radios. In another example, in a system-on-a-chip, the harmonics of a digital signal or clock can show up in RF (radio frequency) and interfere with the desired RF signal reception. In yet another example, in one radio configured to communicate using both Bluetooth and WLAN signals, a Bluetooth transmission can be characterized as interference with respect to WLAN reception as the desired signal. In any of these cases, a need arises for a method of actively cancelling interference from a desired signal.

BRIEF DESCRIPTION OF THE DRAWINGS

FIGS. 9A and 9D illustrate a geometry method for calibrating and tuning of the interference conditioning.

FIGS. 9B and 9C illustrate exemplary switching configurations of the power amplifiers (PAs) and low noise amplifiers (LNAs) of two transceivers.

SUMMARY OF THE INVENTION

Figure 1A:
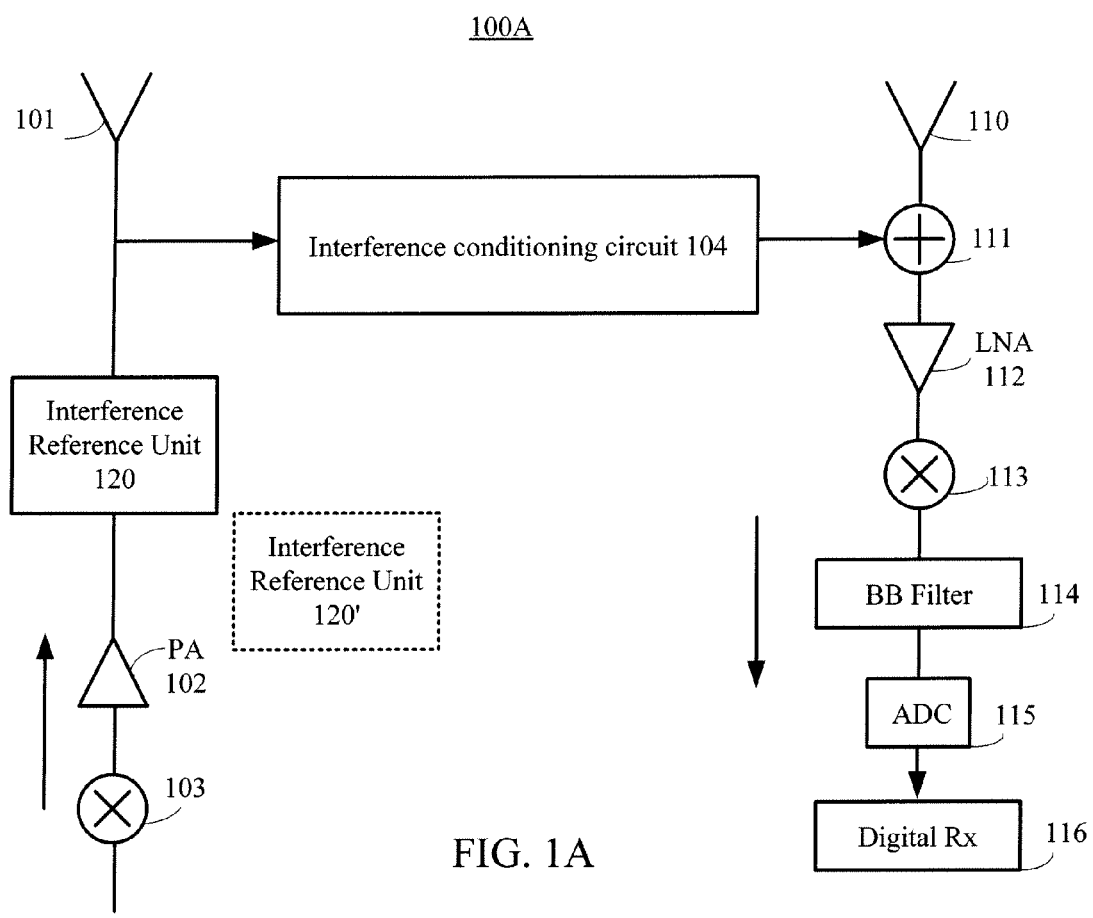
FIG. 1A illustrates a portion of a combination wireless communication system including a transmit path of one type and a receive path of another type. In one embodiment, the transmit path can be part of a Bluetooth transmitter, which can be characterized as the interference source and the receive path can be part of a WLAN receiver.

Various methods and corresponding active interference cancellation units are described herein. In general, these methods and units can perform active interference cancellation in a system including multiple radios. Notably, signals from a first radio are received as interference at a second radio. The described methods and units can provide interference conditioning, which manipulates an interference reference of the interference at the first radio to approximate an interference observed at the second radio. After tuning of the interference conditioning, the interference can be removed.

In a first embodiment, tuning the interference conditioning can use a least mean square (LMS) technique. In this technique, the tuning can be performed for a block of samples from the first radio. The tuning can include adjusting a step size according to a block size, sequentially applying a different phase increment to each block, and estimating an antenna isolation value to adjust the step size. The effectiveness of a current phase can be determined by observing residual signal strength at the second radio. Cancellation signal strength can be derived based on two residual signal strengths and coupling signal strength.

An active interference cancellation (AIC) unit for implementing the first embodiment can include first and second paths, an adder, and a switch set. The first path can include a first variable gain amplifier (VGA) for receiving an observed signal from the first radio and a first gm amplifier for receiving an output of the first VGA. The second path can include a second VGA for receiving the observed signal from the first radio after being phase shifted by 90° and a second gm amplifier for receiving an output of the second VGA. The switch set can selectively connect outputs of the first and second gm amplifiers to the adder. The gains of the first and second VGAs and the first and second gm amplifiers can be adjusted based on a reference signal of the first radio and an observed residual signal of the second radio. In one embodiment, the AIC unit can further include a capacitor divider for providing common mode gain attenuation and a buffer for receiving an output of the capacitor divider and generating the observed signal.

In a second embodiment, tuning the interference conditioning can use a direct technique. This direct technique can include characterizing a response of an interference conditioning path to generate a first result. The coupling channel can be characterized without interference removal to generate a second result. Then, the second result can be divided by the first result to set the interference conditioning.

An AIC unit for implementing the second embodiment can include a first VGA, a delay element, first and second paths, and a switch set. The first VGA can receive a signal from the first radio. The delay element can receive an output of the first VGA and generate a delayed signal. The first path can include a second VGA for receiving the delayed signal. The second path can include a third VGA for receiving the delayed signal after being phase shifted by 90°. The switch set can selectively connect outputs of the second and third VGAs to the adder. The gains of the first, second, and third VGAs and the delay element can be adjusted based on a reference signal of the first radio and an observed residual signal of the second radio.

In a third embodiment, tuning the interference conditioning can use a geometry technique. This geometry technique can include initializing the gain of an AIC unit coupled between the first and second radios to the coupling signal strength and sequentially rotating a cancellation path with 0°, 90°, 180°, and 270° to measure four residual signal strengths at the second radio. Then, a phase of a coupling channel can be derived based on the four residual signal strengths.

An AIC unit for implementing the third embodiment can include a first VGA, a delay element, first and second paths, and first and second switch sets. The first VGA can receive a signal from the first radio. The delay element can receive an output of the first VGA and generate a delayed signal. The first path can include a second VGA for receiving the delayed signal. The second path can include a third VGA for receiving the delayed signal after being phase shifted by 90°. The first switch set can selectively connect outputs of the second and third VGAs to the adder. The second switch set can selectively provide a cancellation mode or a calibration mode for the AIC unit. The gains of the first, second, and third VGAs and the delay element can be adjusted based on a reference signal of the first radio and an observed residual signal of the second radio.

In a fourth embodiment, tuning the interference conditioning can use a search technique. This search technique can include tuning a common mode variable gain amplifier (VGA) to generate the same signal strength in a cancellation path and a coupling path. The VGAs in the cancellation path can be adjusted based on a plurality of phase rotations. A phase with minimum residual signal strength in the second radio can be determined. Using this phase, gains of the VGAs in the cancellation path can be fixed and the common mode VGA can be finely tuned.

An AIC unit for implementing the fourth embodiment can include a first VGA, a delay element, first and second paths, and first switch. The first VGA can receive a signal from the first radio. The delay element can receive an output of the first VGA and generate a delayed signal. The first path can include a first inverter for receiving the delayed signal and a second VGA for receiving an inverted signal from the first inverter. The second path can include a second inverter for receiving the delayed signal and a third VGA for receiving an inverted signal from the second inverter after being phase shifted by 90°. The adder can receive outputs of the second and third VGAs. The first switch can selectively connect an output of the adder to the second radio. The gains of the first, second, and third VGAs, the delay element, and the first and second inverters can be adjusted based on an observed residual signal of the second radio.

In a fifth embodiment, tuning the interference conditioning can use separate interference conditioning for main and side lobes of a signal. This technique can include providing a first interference conditioning in a radio frequency for a main lobe of a signal from the first radio, providing a second interference conditioning in a baseband frequency for at least one side lobe of the signal from the first radio, and removing the interference based on the first interference conditioning and the second interference conditioning.

An AIC unit for implementing the fifth embodiment can include a first interference conditioning circuit implemented in radio frequency (RF) circuitry for cancelling a main lobe of a signal from the first radio. The first interference conditioning circuit can be coupled between an antenna of the first radio and a first adder of the second radio. The AIC unit can further include a second interference conditioning circuit implemented in baseband circuitry for cancelling one or more side lobes of the signal from the first radio. The second interference conditioning circuit can be coupled between a first set of RF to baseband components of the first radio and a second adder of the second radio. The second adder can be coupled to an output of a second set of RF to baseband components of the second radio.

DETAILED DESCRIPTION OF THE DRAWINGS

In a wireless communication system, signal quality degradation can arise because of the impact of a main lobe or even the side lobes of interference. For example, because it is difficult to implement a narrow channel selection filter at RF, the RF front end typically has a fairly wide frequency response (and thus a low quality factor Q). Therefore, a receiver (Rx) front end can be overloaded, i.e. saturated, by the main lobe of very strong in-band or out-of-band interference. Additionally, the analog baseband filter and the ADC (analog-to-digital converter) can be overloaded by a main lobe of the interference. Specifically, if the main lobe of the interference is in-band or close to in-band, then the channel selection filter may not provide any or enough attenuation for the interference.

With respect to the side lobes of interference, in-band noise from a spectral mask of adjacent channel interference may cause problems. A spectral mask is a mathematically-defined set of lines applied to the levels of RF transmissions. The spectral mask is intended to reduce interference by limiting excessive radiation at frequencies beyond the necessary bandwidth. The spectral mask of interference is determined by non-linearity, phase noise, and filtering of the interference transmitter. Unfortunately, the side lobes of the interference may fall in-band and thus become co-channel interference even though the main lobe of the interference is out-of-band.

The overloading of the Rx front end, the analog baseband filter, and the ADC can be mitigated by cancelling the main lobe of the interference signal. The in-band noise from the spectral mask can be mitigated by cancelling the side lobes of the interference that fall in the frequency band of the desired signal. Using Bluetooth and WLAN co-existence at 2.4 GHz as an example where Bluetooth is characterized as interference, the main-lobe cancellation cancels a 1 MHz wide signal, whereas the side-lobe cancellation cancels a 20 MHz or 40 MHz wide signal.

An active interference cancellation can include five parts: interference referencing, interference conditioning, interference removal, interference conditioning tuning, and interference detection.

Interference referencing refers to characterizing the interference, which can be done by using an interference reference unit at the interference source. For example, FIG. 1A illustrates a combination wireless communication system 100A including a transmit path of one type (e.g. a Bluetooth transmitter, which can be characterized as the interference source) and a receive path of another type (e.g. a WLAN receiver). The Bluetooth transmitter includes an antenna 101, a power amplifier 102, and other components (e.g. a mixer 103 shown for illustration). The WLAN receiver includes an antenna 110, an adder 111 (which allows subtraction, thereby providing removal of the interference), a low noise amplifier (LNA) 112, and other components (e.g. a mixer 113, a baseband filter 114, an analog-to-digital converter 115, and digital receiver components 116). To characterize the interference, an interference reference unit 120 can be positioned before or after power amplifier 102 (shown after), which is the last power amplifier of the transmitting radio. In one embodiment, interference reference unit 120 can include a sensing antenna.

In another embodiment, in lieu of interference reference unit 120, an interference reference unit 120' can be used to sample the interference signal. Interference reference unit 120' can include a coupler, which can be resistive (direct connection), magnetic, inductive, or capacitive. This coupler can be integrated on-chip or off-chip.

In yet another embodiment, interference reference unit 120' can include a directional coupler at the interference source. Using a directional coupler can be particularly advantageous when the desired signal is also present at the interference sensing point. For example, if the Bluetooth transmitter and the WLAN receiver share an antenna (e.g. if antenna 101=antenna 110), then the Bluetooth power amplifier output shares the same node as the WLAN low noise amplifier (LNA) input (i.e. the Bluetooth signal is going out to the antenna, whereas the WLAN signal is coming in from the antenna). In this case, a directional coupler, which is able to distinguish between the outgoing Bluetooth signal and the incoming WLAN signal, can be particularly well-suited to get the interference reference from the Bluetooth transmit path.

Interference referencing can also be done by generating an interference replica. In one embodiment, generating an interference replica can be done by tracing the interference source to baseband using interference information bits in the digital domain or the baseband analog signal, converting the interference information bits to analog, and up-converting to RF. In other words, the baseband signal at the interference source can be obtained and its path to RF can be mimicked to generate the interference replica. In another embodiment, generating an interference replica can include intentionally generating harmonics (e.g. a clock), adding distortions (e.g. non-linearity and phase noise) matched to the interference signal path, or generating a reference signal based on filtered (i.e. low pass, high pass, or band pass) interference.

Note that multiple interference referencing can be used when multiple interference conditioning and removal (described below) are desired. The multiple interference referencing can include any combination of the above methods. For example, in a Bluetooth and WLAN co-existence system, the main lobe of interference can be characterized by generating an interference replica and the co-channel side lobes can be characterized by using a sensing circuit at the interference source. In another embodiment, both interference reference units 120 and 120' can be used.

Interference conditioning refers to manipulating the interference referencing to approximate the interference observed at the point to be cancelled. That is, the interference referencing focuses on characterizing the interference at an output of the interference source, e.g. the output of power amplifier 102 of the Bluetooth transmitter, but the removal occurs in the input of the WLAN receiver, e.g. before or after low noise amplifier 112 (shown before in FIG. 1A). Therefore, to accurately remove the interference, the coupling channel between the Bluetooth transmitter and the WLAN receiver (which in FIG. 1A provides the output of power amplifier 102 to the input of low noise amplifier 112) can also be characterized so as to have a response as close as possible (ideally identical to) the interference (as seen by the WLAN) to be cancelled. In FIG. 1A, this manipulation can be performed by an interference conditioning circuit 104, which couples the Bluetooth transmitter and the WLAN receiver.

Further note that interference conditioning can be done (1) in RF after interference referencing and before interference removal or (2) in baseband (digital or analog) before interference referencing is up-converted to RF or removed from the desired received signal in baseband (analog or digital). Baseband interference conditioning may allow more complex computations to be performed than RF interference conditioning. However, note that any non-linearity in baseband may compromise the results of interference conditioning. Therefore, in such cases, the interference conditioning may more easily be performed in RF.

Figure 1B:
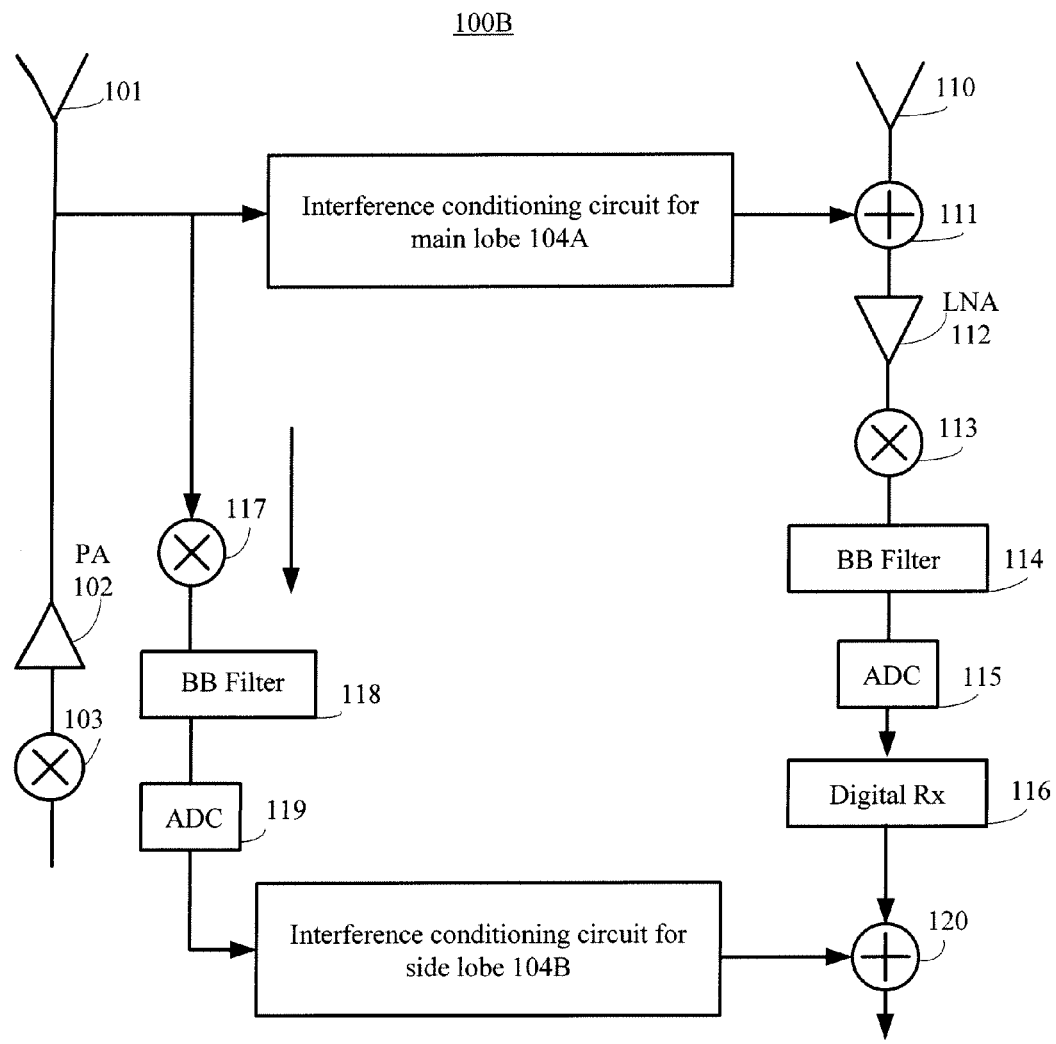
FIG. 1B illustrates an exemplary configuration in which one interference conditioning circuit can provide interference conditioning in RF for the main lobe of a Bluetooth signal and another interference conditioning circuit can provide interference conditioning in baseband for the side lobes of that Bluetooth signal.

In some cases, interference conditioning can be done in both RF and baseband to account for the main lobe and its associated side lobes experiencing different coupling channel responses. For example, if a main lobe of a Bluetooth signal occurs within a WLAN signal band, which could cause saturation, then the main lobe of the Bluetooth signal should be conditioned in RF. However, interference conditioning of the side lobes in baseband may be preferred in this case. FIG. 1B illustrates an exemplary combination wireless communication system 100B in which an interference conditioning circuit 104A provides interference conditioning in RF for the main lobe of a Bluetooth signal and an interference conditioning circuit 104B provides interference conditioning in baseband for one or more side lobes of that Bluetooth signal. In one embodiment, a mixer 117, a baseband filter 118, and an ADC 119 can provide processing of the Bluetooth signal for interference conditioning circuit 104B. Note that the results for both interference conditioning circuits 104A and 104B can be summed by an adder 120 in the WLAN receive path. These results can be used to provide accurate interference cancellation, which is described below.

Note that if adaptive frequency hopping (AFH) is adopted in Bluetooth (wherein Bluetooth avoids the frequency being used by the WLAN), then the Bluetooth main lobe is outside of the WLAN signal band, but a portion of the Bluetooth side lobes can still fall in the WLAN band. In this case, interference conditioning of the main and side lobes of the Bluetooth signal can be done in baseband and RF, respectively.

Further note that in AFH, the interferers move frequently in frequency. Therefore, the interference conditioning may need to be different for each frequency hop (particularly the phase). In one embodiment, a conditioning coefficient can be determined on each hop, and a table (e.g. a look-up table) can be constructed including conditioning coefficients for different frequencies. These conditioning coefficients can be updated on each hop so that they represent the best possible first guess at the conditioning coefficients for each hop.

In some embodiments, because WLAN is wideband, i.e. 20 or 40 MHz wide, the coupling channel response may not be flat over the WLAN band. Moreover, even if the amplitude is flat, the phase may not be flat. In these cases, the entire WLAN band can be divided into narrow sub-bands and different interference conditioning can be applied for each sub-band.

In one embodiment, the interference conditioning can include manipulating a complex number H having amplitude and phase, wherein the complex number H characterizes the coupling channel. This manipulation can be used when the channel that couples the interference to the desired signal (e.g. the WLAN signal) has a flat response, i.e. no multipath is present. In another embodiment, the interference conditioning can include manipulating multiple complex numbers, one for each sub-bandwidth. For example, a sub-bandwidth can be 312.5 kHz (one WLAN OFDM bin), 1 MHz (Bluetooth signal bandwidth), 20 or 40 MHz (WLAN signal bandwidth), etc. This manipulation can be used when the coupling channel is frequency selective, i.e. assuming a flat response within a sub-band, but multipath conditions existing between sub-bands.

Alternatively, interference conditioning can include manipulating a complex number H having a delay $\tau$. This manipulation can be used when the coupling channel provides single path RF waveform propagation, such as over-the-air between closely spaced antennas 101 and 110. In another embodiment, the interference conditioning can include manipulating multiple complex numbers having delays, one for each sub-bandwidth. This manipulation can be used when the coupling channel is split into multiple, separate frequency bands (e.g. the main lobe frequency band and the co-channel side lobe frequency band). Note that the frequency bands must be far enough apart so that their complex numbers and delay values are different.

A complex number can be implemented in the digital domain by digital signal processing. In the analog domain, various circuit architectures can be used based on the representation of a complex number. In one embodiment, the complex number can be represented using amplitude and phase, i.e. $H=|H|*e^{j\Phi}$.

Figure 2:
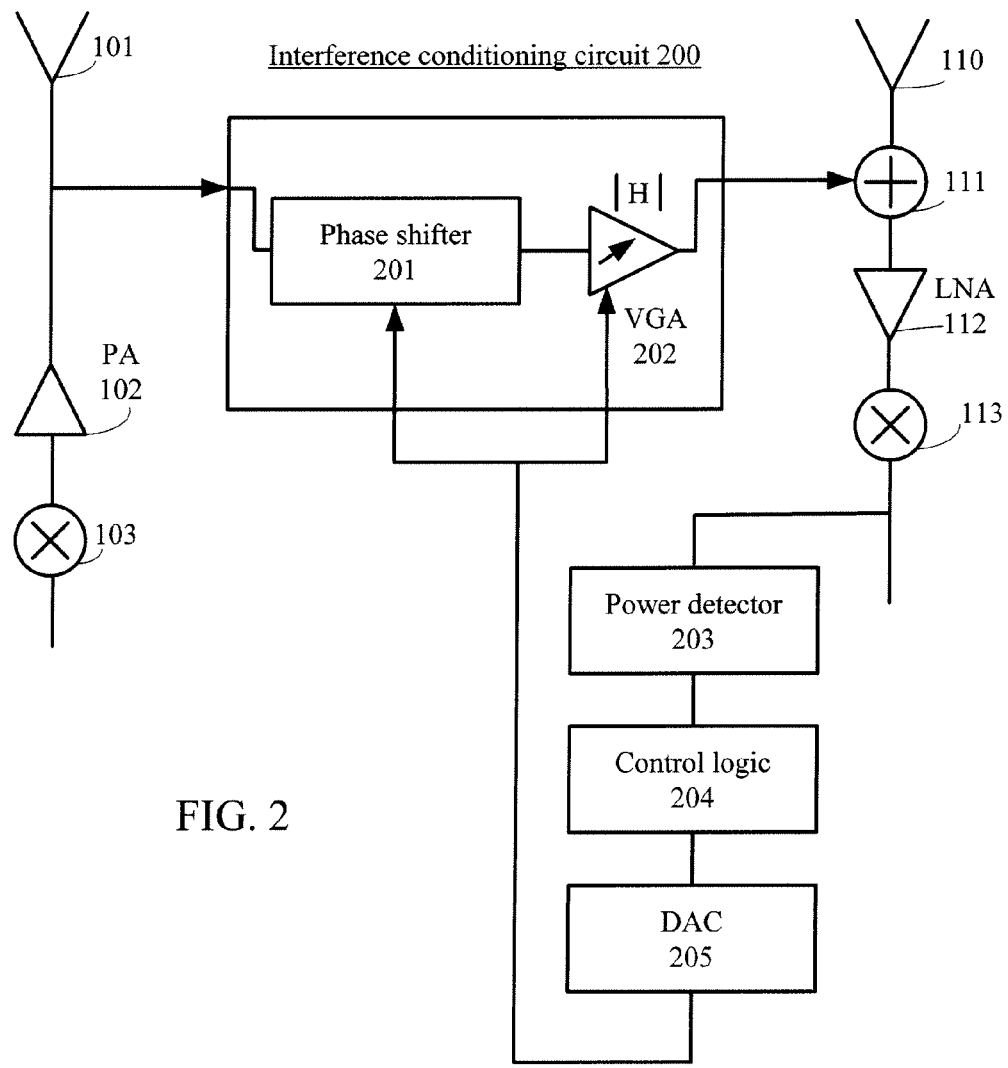
FIG. 2 illustrates an exemplary interference conditioning circuit that can manipulate a complex number H assuming flat coupling.

FIG. 2 illustrates an exemplary interference conditioning circuit 200 that can manipulate a complex number H assuming flat coupling. In this embodiment, interference conditioning circuit 200 can include a phase shifter 201 and a variable gain amplifier (VGA) 202 connected in series between the Bluetooth transmitter and the WLAN receiver. Note that circuitry including a power detector 203, control logic 204, and a digital-to-analog converter 205 can process a signal output by mixer 113 to control the phase of phase shifter 201 and the gain of VGA 202. Note that with the feedback provided by these components of the WLAN receive path, interference conditioning circuit 300 can also provide interference cancellation.

Figure 3:
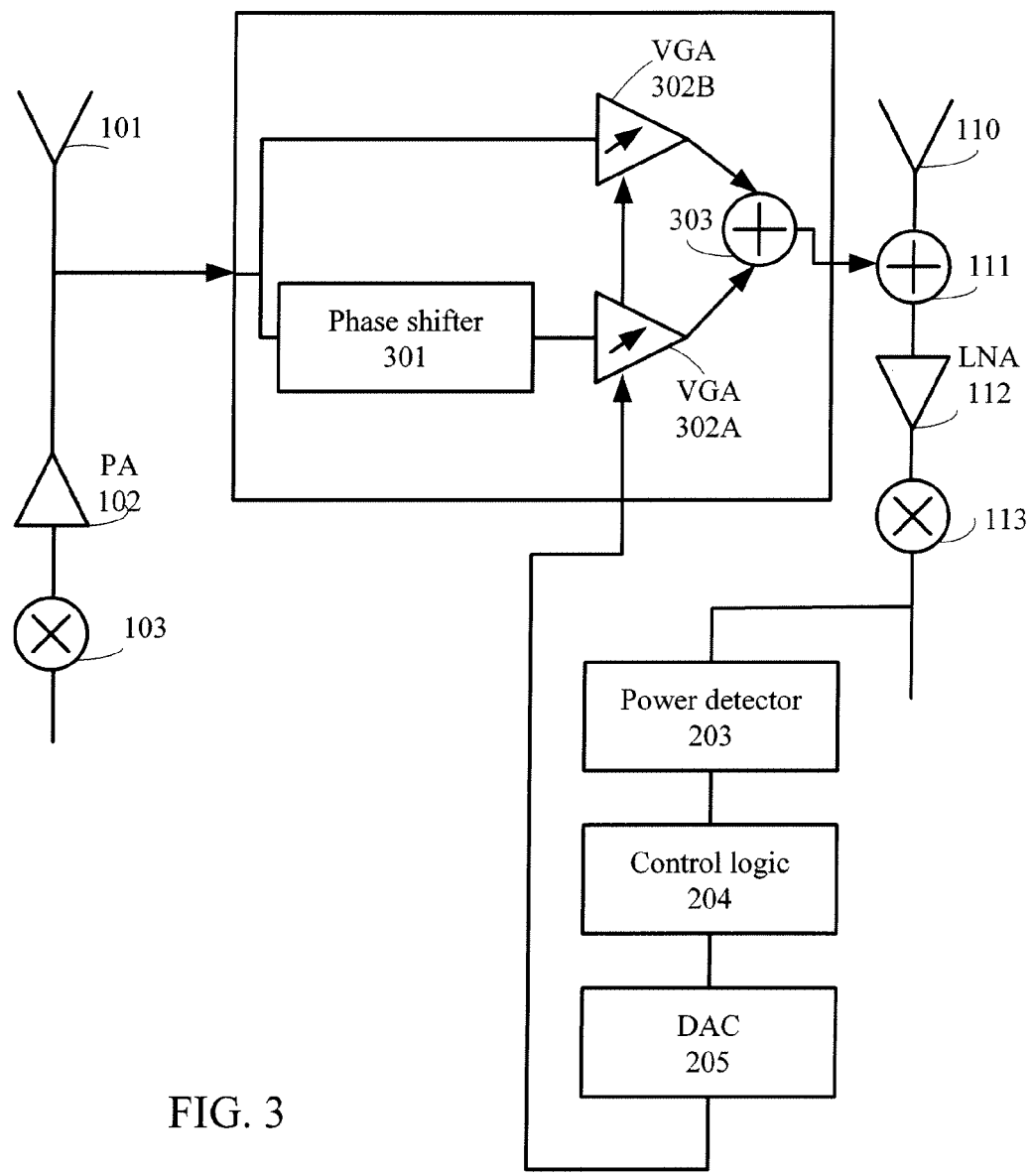
FIG. 3 illustrates another exemplary interference conditioning circuit that can manipulate a complex number H assuming flat coupling.

FIG. 3 illustrates another exemplary interference conditioning circuit 300 that can manipulate a complex number H assuming flat coupling. In this embodiment, interference conditioning circuit 300 can include two paths. A first path can include a phase shifter 301 and a VGA 302A connected between the interference source and an adder 303. Phase shifter 301 can shift the output signal of PA 102 by 90 degrees and VGA 302A can generate $|H|\sin(\phi)$ A second path can include a VGA 302B connected between the interference source and adder 303, wherein VGA can generate $|H|\cos(\phi)$. The sum of adder 303 is then provided to adder 111 in the WLAN receiver. VGAs 302A and 302B can be controlled by feedback generated by the processing of power detector 203, control logic 204, and DAC 205, which are described above.

Figure 4:
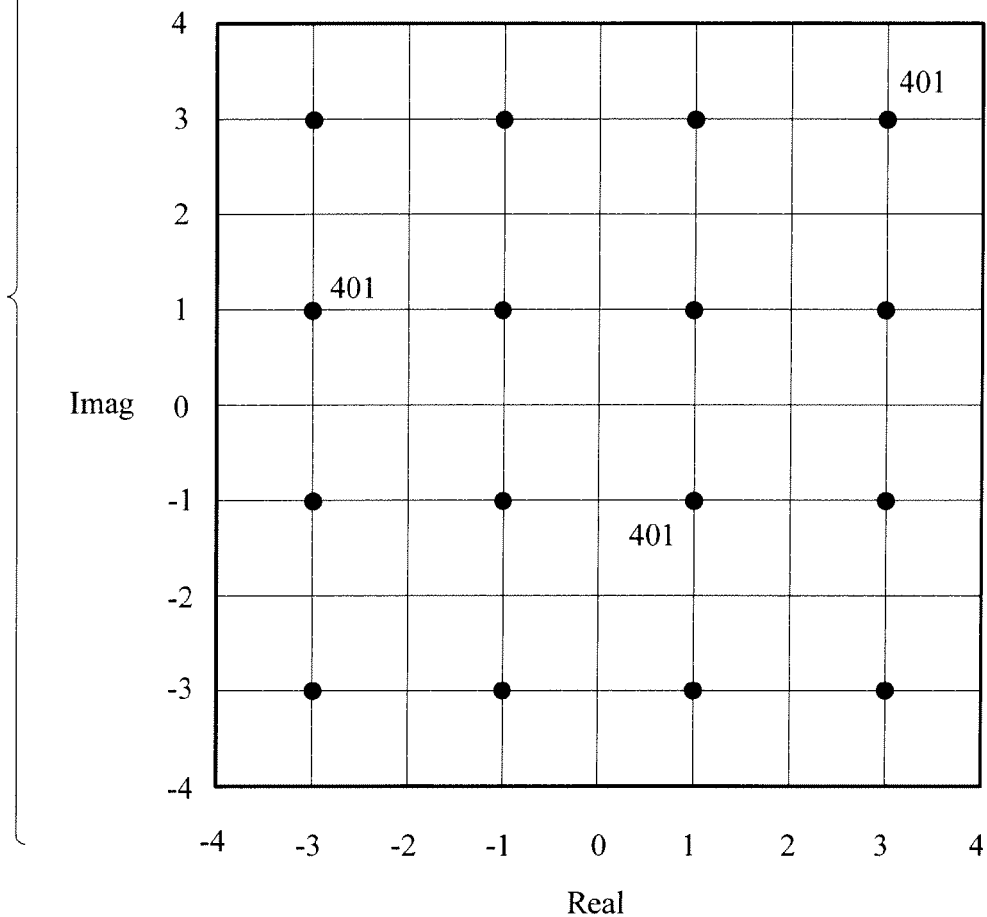
FIG. 4 illustrates an exemplary grid that can represent a complex number H using real and imaginary values positioned at Cartesian coordinates.

In another embodiment, the complex number H can be represented using real and imaginary parts in Cartesian coordinates: $H(f)=a+jb$, wherein a and b are vectors. FIG. 4 illustrates an exemplary grid with real coordinates on the x-axis and imaginary coordinates on the y-axis. The evenly-spaced black dots 401 correspond to the values in vectors a and b shown in FIG. 4 (i.e. −3, −1, 1, and 3).

Figure 5:
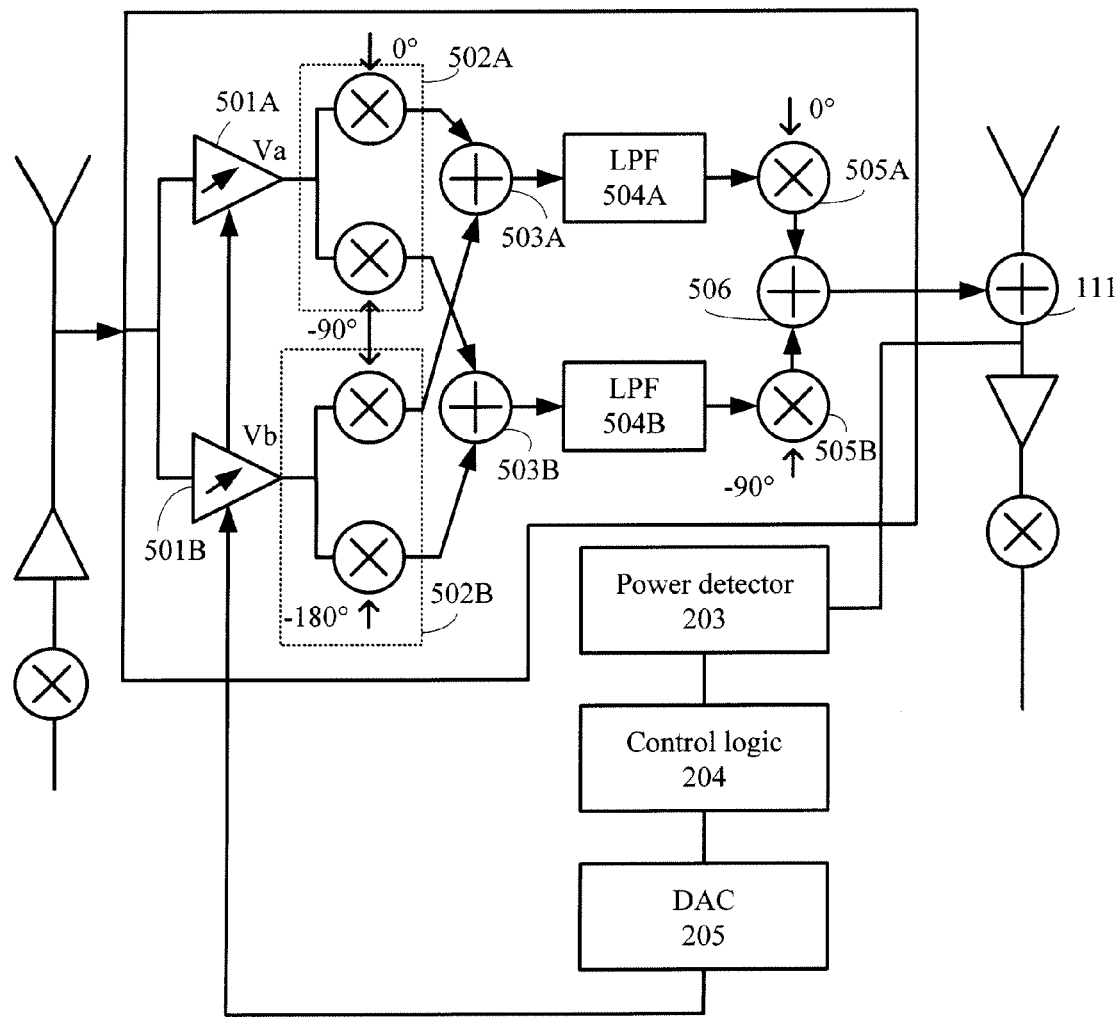
FIG. 5 illustrates an exemplary interference conditioning circuit that can manipulate H using complex multiplication in Cartesian coordinates.

FIG. 5 illustrates an exemplary interference conditioning circuit 500 that can manipulate H using complex multiplication in Cartesian coordinates. In this embodiment, interference conditioning circuit 500 can include first and second paths.

A first path can include a VGA 501A, a mixer set 502A (which provides 0 and −90 degrees mixer signals), an adder 503A that receives the products generated by the 0 degree and the −90 degree mixers of mixer sets 502A and 502B (described below), a low pass filter (LPF) 504A that receives the sum generated by adder 503A, and a mixer 505A that provides a 0 degree mixer signal to the output of LPF 504A. A second path can include a VGA 501B, a mixer set 502B (which provides −90 degree and −180 degree mixer signals), an adder 503B that receives the products generated by the −90 degree and the −180 degree mixers of mixer sets 502A and 502B, a low pass filter (LPF) 504B that receives the sum generated by adder 503B, and a mixer 505B that provides a −90 mixer signal to the output of LPF 504B.

An adder 506 can receive the products generated by mixers 505A and 505B and provide its sum to adder 111 of the WLAN receiver. In this embodiment, the processing provided by power detector 203, control logic 204, and DAC 205 can generate a feedback that controls VGAs 501A and 501B (wherein Va:Vb=a:b). Note that the input to power detector 203 can be from RF (shown), analog baseband, or digital baseband of the receiver.

Figure 6:
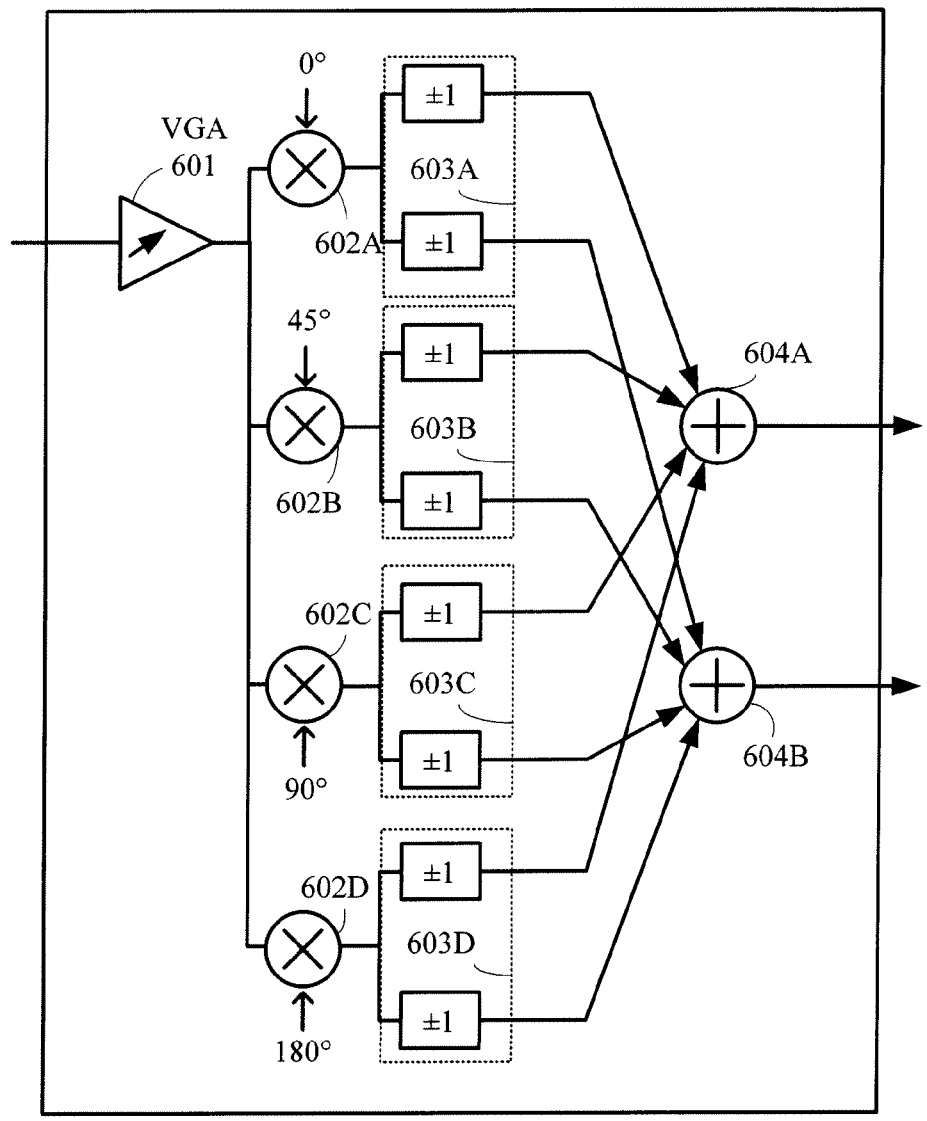
FIG. 6 illustrates an exemplary interference conditioning circuit that can manipulate H using complex multiplication, but restricting $h_0, h_1, \ldots, h_{M-1}$ to be $\{-1, +1\}$.

In yet another embodiment, the complex number can be represented using complex multiplication in oversampled angle. For example, for any complex number H, H can be expanded as $H=h_0+h_1 e^{j(\pi/M)}+\ldots+h_{M-1}e^{j(M-1)\pi/M}$, where M is an integer and $h_0, h_1, \ldots, h_{M-1}$ are restricted to be $(-1, 0, +1)$. FIG. 6 illustrates an exemplary interference conditioning circuit 600 that can manipulate H using the above-described complex multiplication (but restricting $h_0, h_1, \ldots, h_{M-1}$ to be $\{-1, +1\}$). In this embodiment, interference conditioning circuit 600 can include a VGA 601 that provides its output to a set of multipliers 602A, 602B, 602C, and 602D, which provide phase shifting of 0 degrees, 45 degrees, 90 degrees, and 180 degrees, respectively. Each of these multipliers provides its product to a ±1 set: multiplier 602A provides its output to set 603A, multiplier 602B provides its output to set 603B, multiplier 602C provides its output to set 603C, and multiplier 602D provides its output to set 603D. Adders 604A and 604B receive different outputs from each of sets 603A, 603B, 603C, and 603D. In one embodiment, the outputs of adders 604A and 604B can be provided to LPFs 504A and 504B, respectively (FIG. 5).

Figure 7:
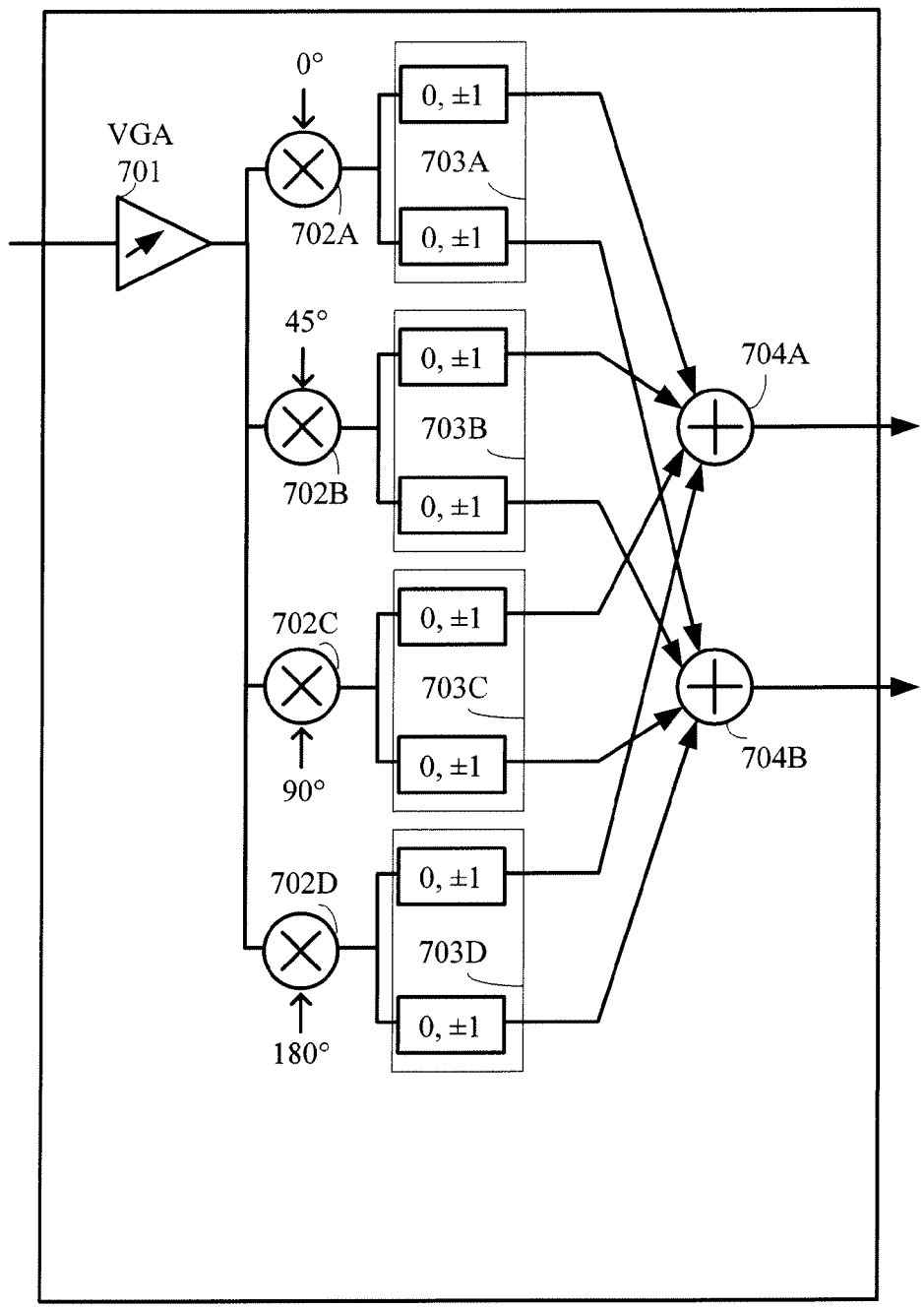
FIG. 7 illustrates another exemplary interference conditioning circuit that can manipulate H using complex multiplication, wherein $h_0, h_1, \ldots, h_{M-1}$ may be $\{-1, 0, +1\}$.

FIG. 7 illustrates another exemplary interference conditioning circuit 700 that can manipulate H using the above-described complex multiplication (wherein $h_0, h_1, \ldots, h_{M-1}$ may be $\{-1, 0, +1\}$). In this embodiment, interference conditioning circuit 700 can include a VGA 701 that provides its output to a set of multipliers 702A, 702B, 702C, and 702D, which provide phase shifting of 0 degrees, 45 degrees, 90 degrees, and 180 degrees, respectively. Each of these multipliers provides its product to a 0, ±1 set: multiplier 702A provides its output to set 703A, multiplier 702B provides its output to set 703B, multiplier 702C provides its output to set 703C, and multiplier 702D provides its output to set 703D. Adders 704A and 704B receive different outputs from each of sets 703A, 703B, 703C, and 703D. In one embodiment, the outputs of adders 704A and 704B can be provided to LPFs 504A and 504B, respectively (FIG. 5). Note that the embodiments shown in FIGS. 6 and 7 can be used to avoid the need for designing precise analog VGA phases and gains.

Note that an RF delay (not shown, but known to those skilled in the art) can be implemented using transmission lines, their RC or LC lumped equivalents, or a digital sampled delay multiplied by a linear phase $2\pi f\tau$, where f is the RF frequency.

After the interference reference is conditioned, it can be subtracted during interference removal (also called cancellation herein). The subtraction can be performed at any number of points in WLAN receive path, e.g. at the antenna and before the low noise amplifier (LNA), after the LNA if the LNA doesn't saturate, in baseband analog before the ADC, or in the digital circuitry after the ADC.

In addition to interference removal, another method to mitigate interference includes treating the interference as noise and using design digital signal processing (e.g. minimum mean square error (MMSE) or maximum likelihood (ML) algorithms) to improve the noise immunity of the receiver's demodulator. Yet another method to mitigate interference includes treating the interference as another desired signal and demodulating both the desired signal and the interference jointly. Note that these two methods may be more effective when a good interference removal is impractical. For example, if the interference reference used for subtraction doesn't match well to the interference, then the attempted interference removal may actually enlarge the interference and thus degrade signal quality further.

Figure 8A:
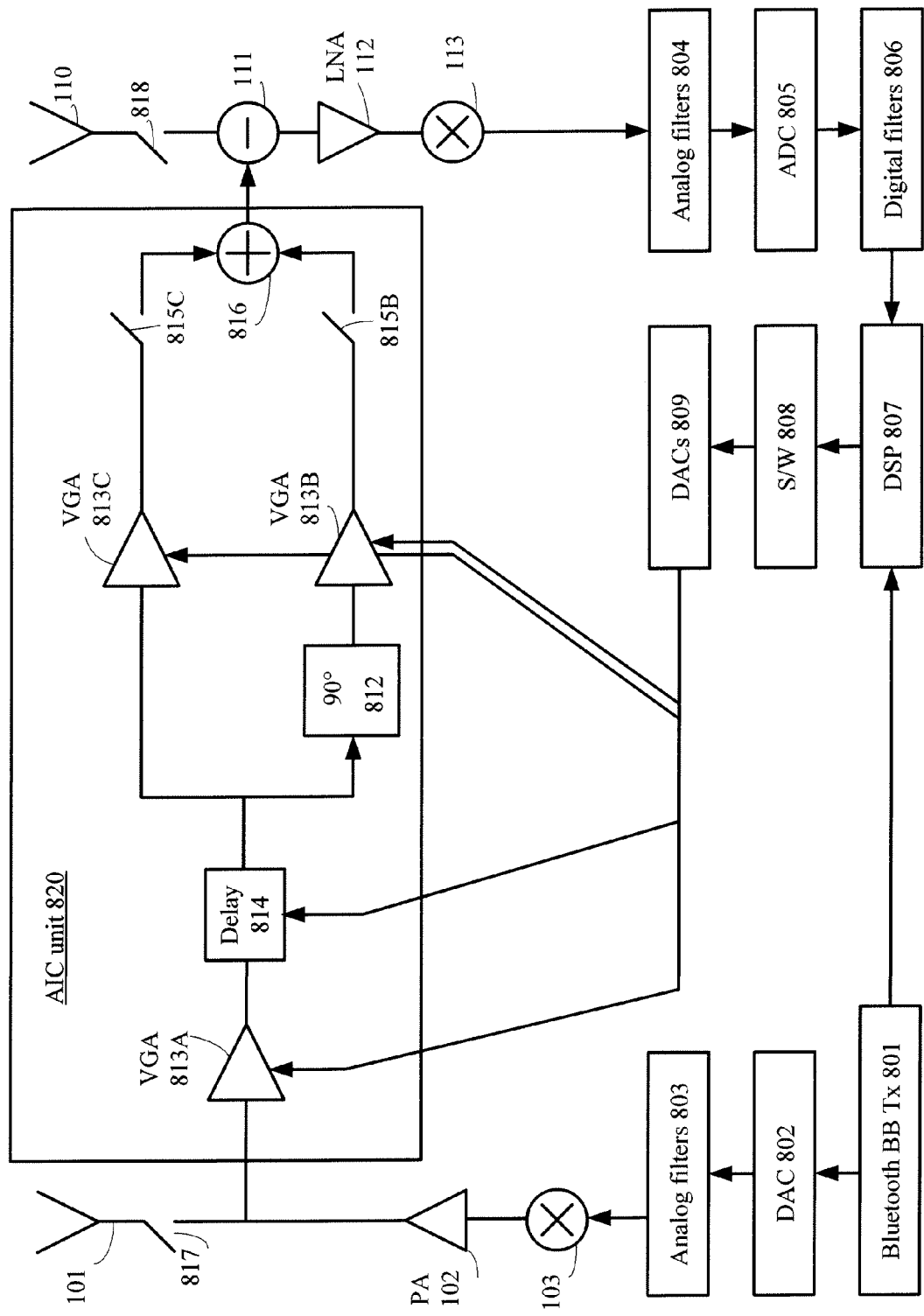
FIG. 8A illustrates an exemplary active interference cancellation (AIC) unit that can be used for a direct tuning of interference conditioning.

FIG. 8A illustrates an exemplary active interference cancellation (AIC) unit 820. In this embodiment, AIC unit 820 includes a VGA 813A, which provides common mode gain attenuation and accounts for antenna isolation. A delay 814 provides a delayed output of VGA 813A to two paths: a first path including a 90 degree phase shifter 812, a VGA 813B, and a switch 815B and a second path including a VGA 813C and a switch 815C. When switches 815B and 815C are closed, the outputs of VGAs 813B and 813C can be summed by an adder 816. The sum generated by adder 816 is then subtracted from the incoming signal at antenna 110 using adder 111. Note that switches 817 and 818 are open when internal calibration signals are active and closed during normal operation.

Note that the receive chain associated with antenna 110 can include the following components in series: adder 111, LNA 112, mixer 113, analog filters 804, an analog to digital converter 805, digital filters 806, a digital signal processor (DSP) 807, software 808, and DACs 809. The transmit chain associated with antenna 101 can include the following components in series: a Bluetooth baseband transmitter 801, a DAC 802, analog filters 803, a mixer 103, and a power amplifier 102. DSP 807 can receive an output from digital filters 806 as well as an output from Bluetooth baseband transmitter 801. DACs 809 can adjust VGAs 813A, 813B, and 813C as well as delay 814. In one embodiment, software can control switches 815B and 815C.

In an actual implementation of AIC unit 820 providing interference conditioning, phase shifting may suffer from imperfect phase adjustment. Further, the multiple paths connecting the transmitter path and the receiver path (i.e. 813C/815C and 812/813B/815B) may result in different propagation lengths. Yet further, variable gains may not be constant across a whole band of interest. Thus, a need arises for interference conditioning and cancellation to be calibrated and/or adaptively tuned. This tuning can use certain training signals sent and measured during a calibration cycle, live traffic during normal operation, or a combination of the two. For example, a calibration cycle can be used to get started and live traffic can then be used for tracking channel changes.

Exemplary tuning techniques described below include: a direct method, a geometry method, a search method, and an LMS method.

Figure 8B:
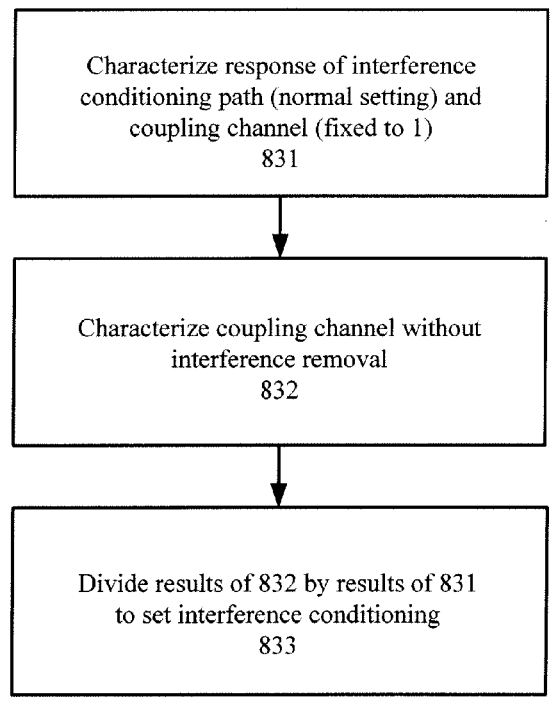
FIG. 8B illustrates a simplified, direct technique in which measurements are done to characterize a coupling channel and an interference conditioning path, and those results are then used to derive the interference conditioning that match the coupling channel.

FIG. 8B illustrates a simplified, direct technique in which measurements are done to characterize a coupling channel and an interference conditioning path, and those results are then used to derive the interference conditioning that match the coupling channel. In one embodiment, this direct technique can include characterizing the response of the interference conditioning path (normal setting) with the coupling channel (fixed to 1, e.g. through a wired connection) in step 831. Step 832 can include characterizing the coupling channel without interference removal. Step 833 can include dividing the results of step 832 by the results of step 831 to set the interference conditioning.

More specifically, at a given Bluetooth hopping frequency, the equivalent channel responses can be estimated from the Bluetooth transmitter baseband to the WLAN receiver baseband through the coupling channel (denoted as $H_{couple}$), the equivalent channel response from Bluetooth transmitter baseband to the WLAN receiver baseband through the direct path in the AIC unit (denoted as $H_{AIC\_DIR}$) (i.e. the path including 813C/815C), and the equivalent channel response from Bluetooth transmitter baseband to WLAN receiver baseband through the quadrature path in the AIC unit (denoted as $H_{AIC\_QUAD}$) (i.e. the path including 812/813B/815B). If the direct path response is treated as a reference, then the coupling channel response would be $c+dj=H_{COUPLE}/H_{AIC\_DIR}$, and the quadrature path response would be $a+bj=H_{AIC\_QUAD}/H_{AIC\_DIR}$.

Note that during the process of estimating $H_{COUPLE}$, $H_{AIC\_DIR}$, and $H_{AIC\_QUAD}$ for a given frequency, the same Bluetooth transmitter gain setting and WLAN receiver gain setting can be used. If these analog gain settings are not fixed, then the common analog gains contributed from the Bluetooth transmitter chain and WLAN receiver chain when calculating a+bj and c+dj may not be eliminated.

An initial step to conduct the direct method is to identify the $H_{COUPLE}$ of each frequency to be calibrated (which may be a subset of the Bluetooth frequencies) based on a proper Bluetooth transmitter gain setting, bt_tx_gain_setting_init, and a proper WLAN receiver gain setting, wlan_rx_gain_setting_init. To accommodate the potentially strong Bluetooth signal, the WLAN receiver LNA can be forced to its minimum gain. With the prior knowledge of typical antenna isolation (e.g. 10 dB~20 dB) and the linear region of the WLAN receiver input level, bt_tx_gain_setting_init can be predetermined. By setting the Bluetooth transmitter gain to bt_tx_gain_setting_init and driving the WLAN down-mixer (e.g. mixer 113) and Bluetooth up-mixer (e.g. mixer 103) with the same frequency (otherwise, a digital mixer at the WLAN receiver might be used), Bluetooth can start to operate in its normal transmission/reception mode. After Bluetooth hops to one of its frequencies, the WLAN receiver can adjust its gain setting to make its ADC output magnitude fall into a desired range. After the AGC settles, the WLAN receiver gain setting, wlan_rx_gain_setting_init, can be recorded. During this coupling channel identification process, bt_tx_gain_setting_init can be continuously used for each hopping frequency and, ideally, as long as the gain variations of the coupling channel and the AIC circuits across the frequency band are within a few dBs, the same wlan_rx_gain_setting_init can be repeatedly used.

In one embodiment, a correlator can be used to estimate $H_{COUPLE}$. In a Bluetooth/WLAN combination chip, the Bluetooth transmitter baseband signal can be exactly known by the WLAN receiver baseband. Therefore, the coupling channel can be identified by correlating a delayed version of the raw Bluetooth transmitter baseband signal with the received signal and selecting the peak correlation value (denoted as $C_{peak}$ as the correlation output. This peak value can then be normalized by the raw Bluetooth signal power (denoted as $P_{raw}$) as $H_{COUPLE}$.

Figure 8C:
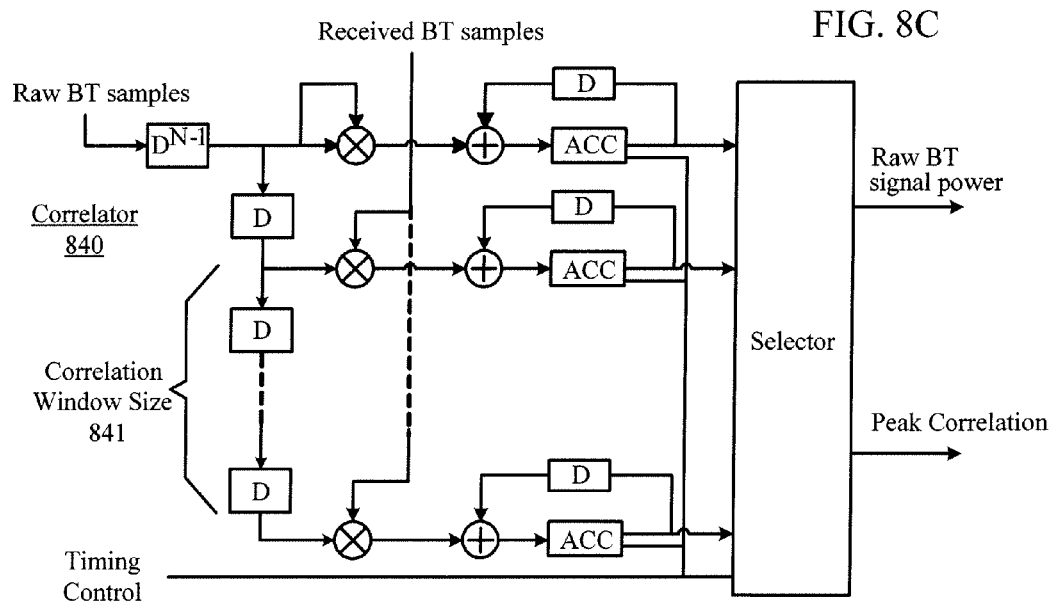
FIG. 8C illustrates an exemplary correlator for estimating $H_{COUPLE}$.

FIG. 8C illustrates an exemplary correlator 840 including D flip-flops (labeled as Ds) and accumulators (labeled as ACCs). Using known coupling delay contributors, a proper correlation start point and a correlation window size 841 can be chosen to maintain affordable computation complexity while guaranteeing a correlation peak. In one embodiment, the coupling delay for delay 814 (FIG. 8A) can be determined by (1) digital delay (which is predictable), (2) RF and analog baseband filter delays (having known, typical values) and (3) propagation delay in the transmission line connecting the external antenna and the on-chip RF port (platform dependent, but known).

Because the WLAN receiver is hopping in frequency with the Bluetooth transmitter during this channel identification process, other Bluetooth signals located within the same WLAN 20/40 MHz band will not be filtered out by the WLAN analog filters. Therefore, in one embodiment, an LPF (e.g. 1 MHz) can be included in analog filters 804 or in digital filters 806 to filter out those undesired signals for a better correlation result.

Ideally, the normalized correlation peak should stay at a constant magnitude. This constant peak value can be determined by the raw Bluetooth bit width, the ADC bit width, the AGC target level, and the LPF bit width, all of which are known. However, any co-channel interference (e.g. other WLAN or Bluetooth signals) can degrade the peak magnitude. Therefore, in one embodiment, the normalized peak magnitude can be monitored in software to check if the current identification is reliable. If the normalized correction peak is lower than a predefined threshold, then that measurement can be discarded.

After bt_tx_gain_setting_init and wlan_rx_gain_setting_init of all specified frequencies are obtained, normal Bluetooth operation can be suspended and computing a+bj and $H_{AIC\_DIR}$ can proceed. For each specified frequency, the Bluetooth transmitter gain setting and the WLAN Rx gain setting can be configured to bt_tx_gain_setting_init and wlan_rx_gain_setting_init, respectively (alternatively, a true gain difference between each gain setting, if known, can be used). Both antennas 101 and 110 are switched off, and two repeated baseband DC chunks can be transmitted though AIC unit 820. The first DC chunk ($\alpha+j\alpha$) can pass through the direct path with VGA 813C being set to its nominal 0 dB gain. At this point, VGA 813A is adjusted until the ADC output magnitude falls into the target range. After removing the receiver residual DC offset, a period of output samples of ADC 805 are then averaged to get the first estimate $DC_{est1}$. The second DC chunk (a+ja) can pass through the quadrature path with VGA 813B being set to its nominal 0 dB gain. After removing the receiver residual DC offset, the second estimate $DC_{est2}$ is obtained. $H_{AIC\_DIR}$ is then derived as $DC_{est1}/(\alpha+j\alpha)$, and a+bj is derived as $DC_{est2}/DC_{est1}$.

After calibrating at those specified calibration frequencies, c+dj ($=H_{COUPLE}/H_{AIC\_DIR}$) can be derived. With the knowledge of a+bj and c+dj, VGA 813C and VGA 813B can be set to c−ad/b and d/b, respectively, to achieve the cancellation at that frequency. Note that if c−ad/b exceeds the maximum gain of VGA 813C or d/b exceeds the maximum gain of VGA 813B, the set gains should be lowered by a common gain, which is then transferred to VGA 813A.

FIG. 9A illustrates a geometry method for calibrating and tuning of the interference conditioning. In this method, after initializing the AIC unit gain to the coupling signal strength, the cancellation path can be sequentially rotated by 90° (i.e. 0°, 90°, 180°, and 270°) to measure four residual signal strengths. In FIG. 9A, the dotted arrows $I_6$ represent the cancellation signal strengths, the solid arrows $I_1$, $I_2$, $I_3$, and $I_4$ represent residual signal strengths, and the dashed arrow $I_5$ represents the coupling signal strength. With the knowledge of the four residual signal strengths, the phase of the coupling channel can be derived. To precisely synthesize 90° phase rotation, the quadrature path in the AIC unit can be calibrated first.

FIGS. 9B and 9C illustrate exemplary switching configurations of the power amplifiers (PAs) and low noise amplifiers (LNAs) of two transceivers: a first transceiver including a WLAN transmitter and a WLAN receiver and a second transceiver including a Bluetooth transmitter and a Bluetooth receiver. In FIGS. 9B and 9C, four switches 901, 902, 903, and 904 can be used to configure the transceivers for a calibration mode and a cancellation mode.

Figure 9E:
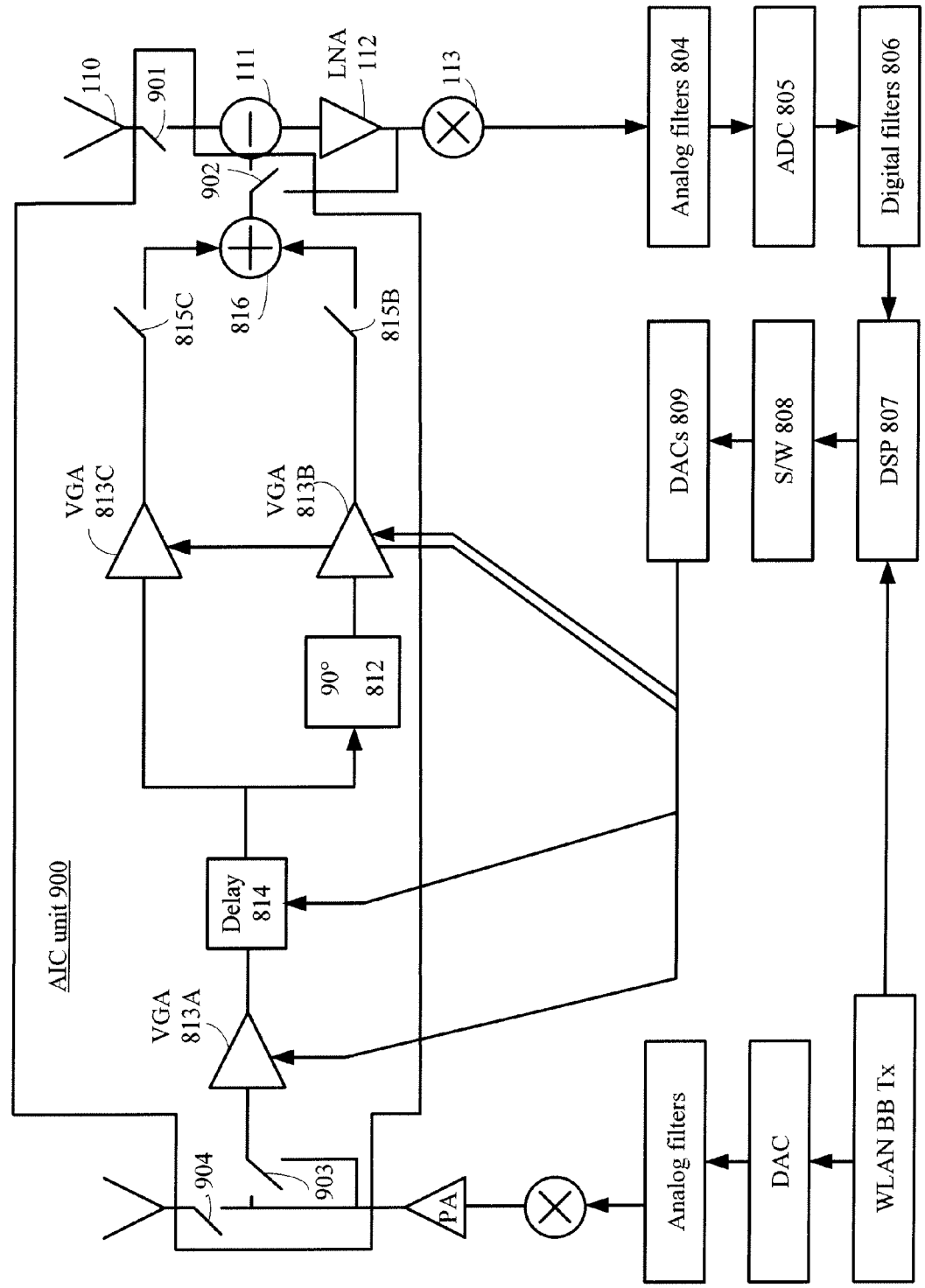
FIG. 9E illustrates an exemplary AIC unit for implementing geometry tuning of the interference conditioning.

For example, referring to FIG. 9B, to perform the calibration mode, the PA of the BT transceiver and the LNA of the WLAN transceiver can be turned off, i.e. bypassed, thereby enabling a loopback path from the BT transmitter to the WLAN receiver. At this point, the loopback receiver I/Q cal result and the residual receiver DC cal result produced in the transmitter I/Q calibration process can be utilized to correct the receive path. In the AIC unit, e.g. AIC unit 820 shown in FIG. 9E, VGA 813A is set to an initial gain and VAGs 813B and 813C are set to a nominal 0 dB gain.

With these gain settings, and referring to both FIGS. 9B and 9E, the BT transmitter can then transmit two repeated DC chunks, one through the direct path (i.e. VGA 813C) and another through the quadrature path (i.e. 812/813B/815B) in AIC unit 820. At this point, the WLAN receiver ADC (805) output can be sized to a target value by adjusting BT transmitter gain setting. The WLAN receiver receives two DC chunks (with Rx I/Q and DC correction as indicated above) to get two DC measurements: $DC_{est1}$ and $DC_{est2}$. The desired calibration result a+bj is then obtained from $DC_{est2}/DC_{est1}$. Note that the transmitter I/Q and any carrier leak in the BT transmitter need not be corrected because they won't affect the a+bj calibration result. According to this calibration result, to represent the multiplication of (1+j), VGA 813C and VGA 813B are set to 1−a/b and 1/b, respectively. To represent the multiplication of (1−j), VGA 813C and VGA 813B are set to 1+a/b and −1/b, respectively. To represent the multiplication of (−1−j), VGA 813C and VGA 813B are set to −1+a/b and −1/b, respectively. To represent the multiplication of (−1+j), VGA 813C and VGA 813B are set to −1−a/b and 1/b, respectively.

After AIC calibration, the coupling channel identification process can proceed. In this process, the AIC unit can be disabled and the WLAN Rx mixer and the BT Tx mixer can be driven by the same frequency (otherwise, a digital mixer at the WLAN receiver might be used). Then, the WLAN Rx can be configured to normal reception mode. The WLAN Rx LNA gain can be set to the minimum during the whole process to avoid saturation. The BT Tx transmits the Bluetooth signal, and the WLAN Rx mixer+BB gain can be adjusted to properly size the received signal such that the 1 MHz-LPF output power (=rx_pwr_desired) falls within the target range.

The WLAN Rx gain setting can be fixed by switching off the WLAN Rx antenna and enabling the AIC unit. VGA 813C and VGA 813C can be set to represent (1+j). At this point, the gain of VGA 813A can be adjusted such that WLAN Rx 1 MHz-LPF output power=rx_pwr_desired. The gain of VGA 813A can be fixed by switching on the Rx antenna and sequentially adjust VGAs 813C and 813C corresponding to 1+j, −1−j, −1+j, and −1−j representations to measure the residual powers.

At this point, the residual power results can be used to calculate the coupling phase. Note that $I_1$, $I_2$, $I_3$, and $I_4$ correspond to the residual signal magnitude with AIC settings of 1+j, −1−j, 1−j, and −1+j, respectively. $I_5$ is the signal magnitude as measured when the Bluetooth Tx transmits the Bluetooth signal.

$$\cos(\angle A) = \frac{I_5^2 + I_6^2 - I_1^2}{2 \cdot I_5 \cdot I_6}$$

$$\sin(\angle A) = \frac{I_5^2 + I_6^2 - I_4^2}{2 \cdot I_5 \cdot I_6}$$

$$-\cos(\angle A) = \frac{I_5^2 + I_6^2 - I_2^2}{2 \cdot I_5 \cdot I_6}$$

$$-\sin(\angle A) = \frac{I_5^2 + I_6^2 - I_3^2}{2 \cdot I_5 \cdot I_6}$$

$$\cos A = \frac{b^2 + c^2 - a^2}{2 \cdot b \cdot c}$$

(see FIGS. 9A and 9D)

Note that theoretically only two measurements are required to identify the angle A. However, more measurements can be used to get a more accurate result. In one embodiment, the gain of VGA 813C can be set=(1−a/b)*cos(A)−(1+a/b)*sin(A), and the gain of VGA 813B can be set=(sin(A)+cos(A))/b for this frequency. If VGA 813C and/or VGA 813B are out of their range, then they can be lowered with a common gain, which can be transferred to VGA 813A.

Figure 10A:
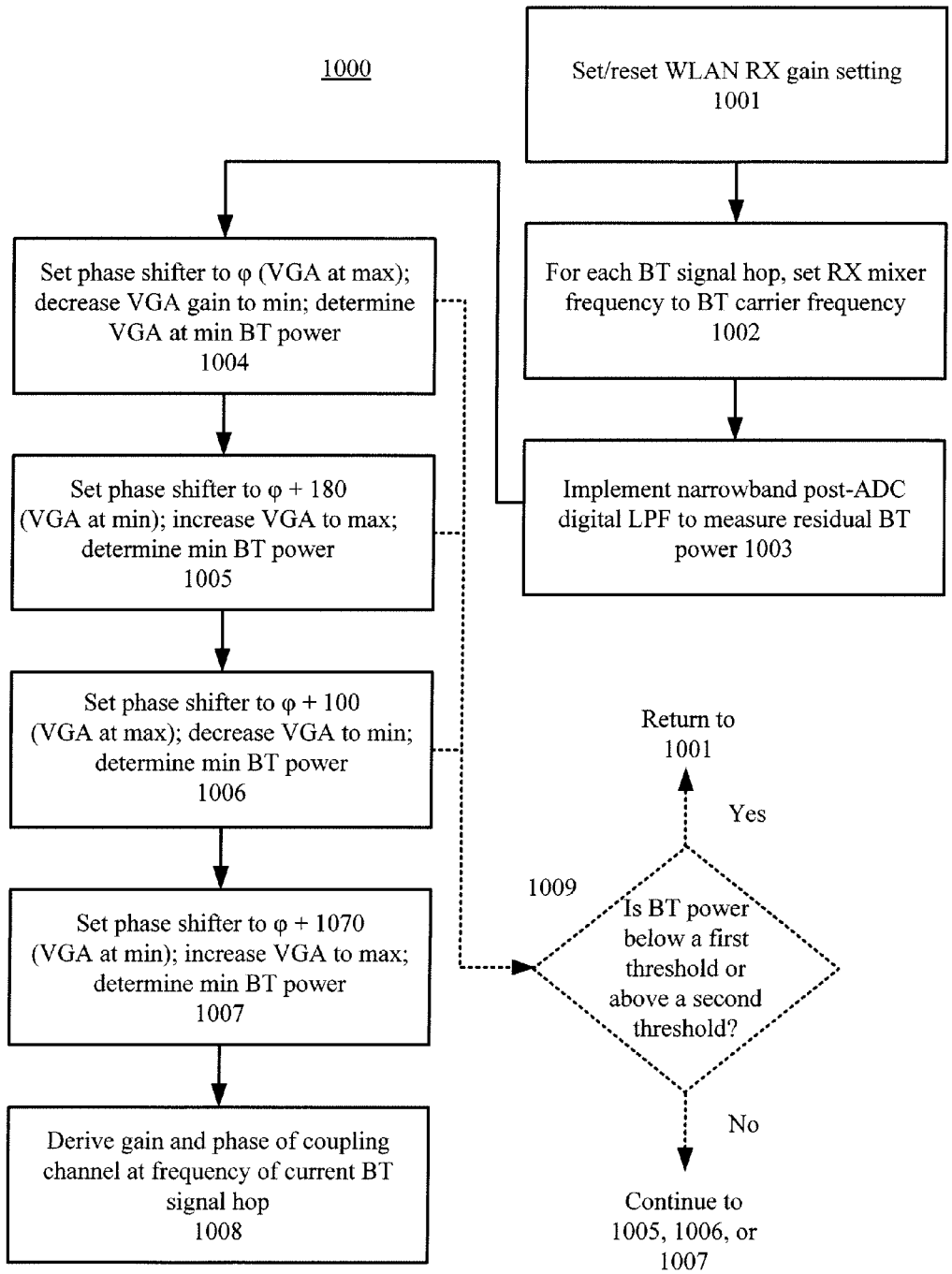
FIG. 10A illustrates an exemplary technique for search tuning of the interference conditioning.

FIG. 10A illustrates an exemplary technique 1000 for search tuning of the interference conditioning. In technique 1000, the parameter space of the interference conditioning can be searched to find the best parameters that result in the best signal quality after interference cancellation. In one embodiment, multiple search algorithms can be used, e.g. linear search, binary search, and random annealing. For example, step 1001 can include setting an initial WLAN RX gain setting. In one embodiment, this initial gain setting can be roughly pre-determined. For example, if the required residual Bluetooth power after cancellation is about −40 dBm, then a rough receiver gain can be derived to get a reasonable ADC input size. In step 1002, for each Bluetooth signal hop, the receiver mixer frequency can be set to the Bluetooth carrier frequency. In step 1003, a narrowband (Bluetooth bandwidth) post-ADC, digital low pass filter (LPF) can be implemented in the WLAN device to measure the residual Bluetooth power.

In step 1004, a phase shifter of a cancellation unit can be set to an arbitrary initial phase $\phi$ and VGA 202 (FIG. 2) can be set to its maximum value. The VGA gain can then be decreased to its minimum value step by step. For each step, the Bluetooth power can be measured and recorded. Using these measurements, the VGA setting corresponding to the minimum Bluetooth power at $\phi$ can be determined. In step 1005, the phase shifter can be set to $\phi$+180° (VGA at minimum) and the VGA can be increased step by step to its maximum value. For each step, the Bluetooth power can be measured and recorded. Using these measurements, the VGA setting corresponding to the minimum measured Bluetooth power at $\phi$+180° can be determined. In step 1006, the phase shifter can be set to $\phi$+90° (VGA then being at its maximum value) and the VGA gain can be decreased to its minimum value step by step. For each step, the Bluetooth power can be measured and recorded. Using these measurements, the VGA setting corresponding to the minimum measured Bluetooth power $\phi$+90° can be determined. In step 1007, the phase shifter can be set to $\phi$+270° (VGA then being at its minimum value) and the VGA gain can be increased to its maximum value step by step. For each step, the Bluetooth power can be measured and recorded. Using these measurements, the VGA setting corresponding to the minimum measured Bluetooth power at $\phi$+270° can be determined. Step 1008 can derive the gain and the phase shifting value of the coupling channel at the frequency of the current Bluetooth hop using the VGA and phase shifting settings for minimum Bluetooth power determined in steps 1004, 1005, 1006, and 1007.

In one embodiment, step 1009 can follow each of steps 1004, 1005, and 1006 to determine whether the minimum Bluetooth power falls below a first threshold, which means the current RX gain setting is insufficient. If so, then the process can return to step 1001 to reset a larger RX gain setting. Step 1009 can also determine whether a maximum Bluetooth power is above a second threshold, which means that the ADC could saturate. If so, then upon returning to step 1001, a smaller RX gain can be set. Note that the gain difference between two different RX gain settings can be taken into account to reflect the actual Bluetooth signal power in step 1002. If the Bluetooth power is between the first and second thresholds, then the process can return to the next downstream step (i.e. 1004→1009→1005, 1005→1009→1006, 1006→1009→1007).

In one embodiment, steps 1001-1008 (or 1001-1009) can be repeated for several Bluetooth hops. Note that when using steps 1001-1008, the RX gain and the VGA range can be modified according to the results provided by the previous iteration of steps 1001-1008. The phase slope of the coupling channel can be estimated based on the results from several Bluetooth hops.

Figure 10B:
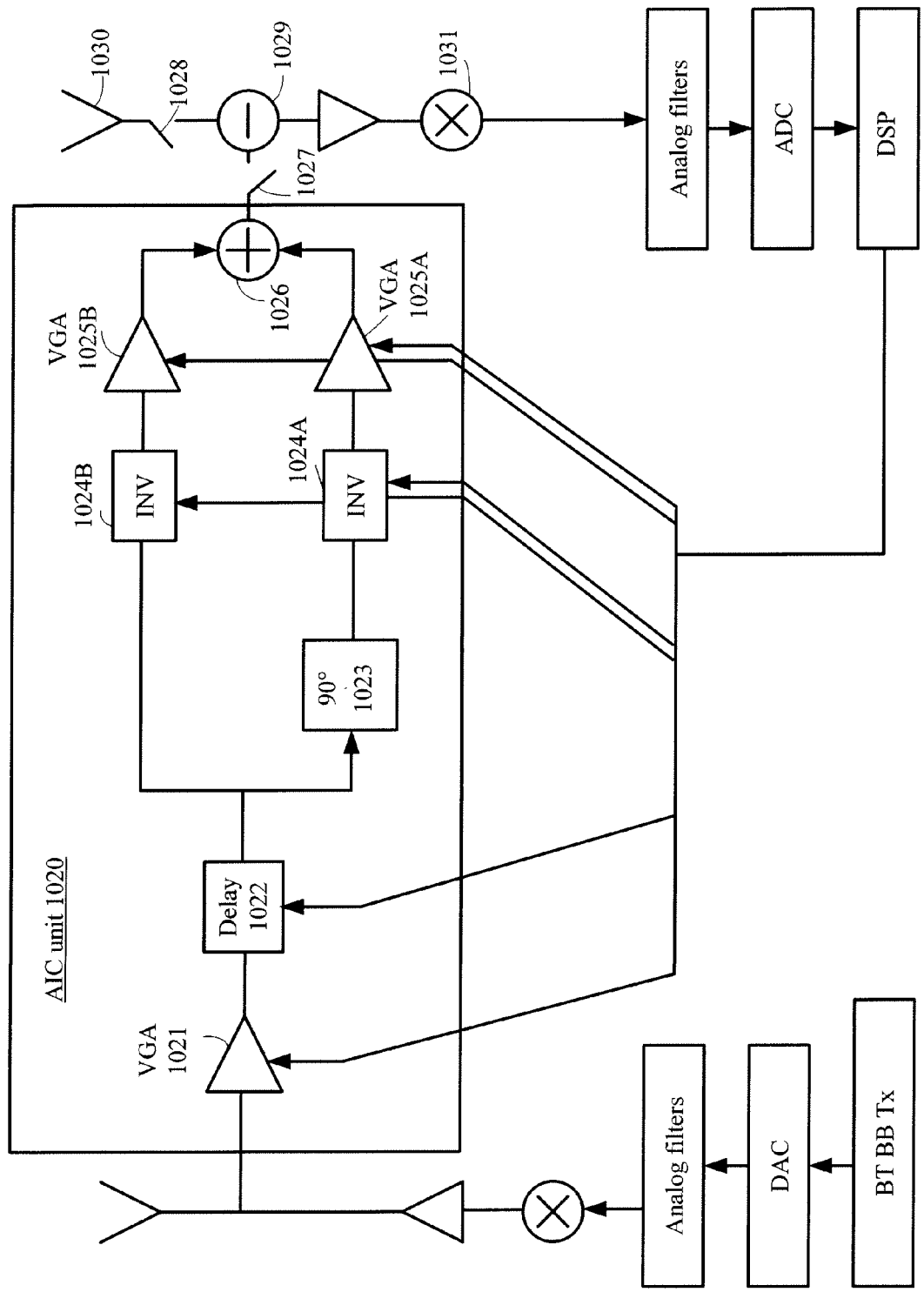
FIG. 10B illustrates an exemplary configuration for an AIC unit for implementing the search tuning of the interference conditioning.

In another embodiment of a search tuning technique, the two-dimension search problem can be separated into two one-dimension search problems. FIG. 10B illustrates an exemplary configuration for an AIC unit 1020, which includes a VGA 1021, a delay 1022, and two paths. A first path includes a phase shifter 1023, an inverter 1024A, and a VGA 1025A, whereas a second path includes an inverter 1024B and a VGA 1025B. VGAs 1025A and 1025B provide their outputs to an adder 1026, which is selectively connected to an adder 1029 using a switch 1027. A WLAN antenna 1030 is selectively connected to adder 1029 via a switch 1028. In this technique, given the initial gain settings for VGA 1025A and 1025B, VGA 1021 can be tuned such that the cancellation path can have roughly the same signal strength as the coupling path. Then, the phase dimension can be searched by sequentially rotating the phase of the cancellation path (i.e. VGA 1025B and VGA 1025A are adjusted according to the phase rotation). After finding out the best phase with the minimum residual signal strength, the gains for VGA 1025A and 1025B can be fixed and the gain of VGA 1021 can be finely tuned to get a more accurate result.

Figure 10C:
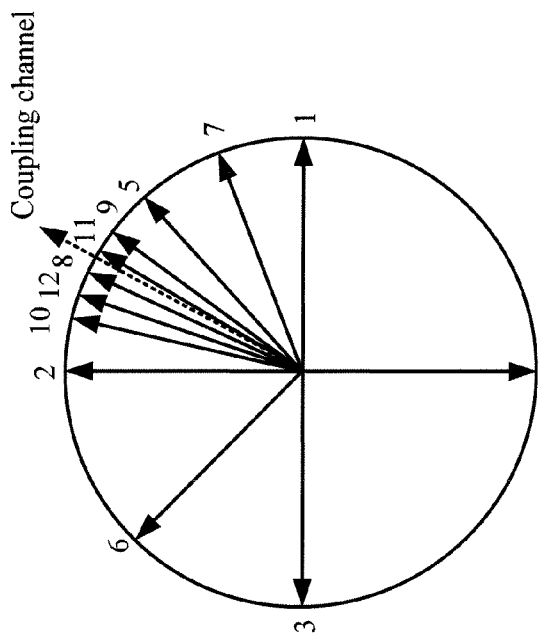
FIG. 10C provides an exemplary search technique including phase rotations.

FIG. 10C provides an exemplary search technique including phase rotations. In FIG. 10C, the numbers labeled around the circle denote the search sequence. The strategy is to only retain three contiguous phases in each search round. The middle one of the retained phases is the best phase at present (i.e. with the minimum residual signal strength), and the other two are phases closest to the best one. In the next round, two phases that can evenly divide the retained phase space are searched. Among these five phases (i.e. three phases retained from the previous round plus two recently searched phases), the same rule described above can be applied to retain only three of them. In one embodiment, five rounds corresponding to twelve searched phases are sufficient for 30 dB cancellation requirement.

As noted in FIG. 10C, the best phase in the first round is no. 2, so no. 1, 2 and no. 3 are retained for the second round. In the second round, AIC unit 1020 can be set to represent no. 5 and no. 6. Among these five AIC settings (i.e. no. 1, 2, 3, 5, and 6), if the best phase is no. 5, then no. 5, 1, and 2 are retained for the third round. In the third round, AIC unit 1020 can be set to represent no. 7 and no. 8, respectively. If no. 8 is the best phase, then no. 8, 5, and 2 are retained for the fourth round. In the fourth round, AIC unit 1020 can be set to represent no. 9 and no. 10. If no. 8 is the best phase, then no. 8, 9, and 10 are retained for the fifth round. In the fifth round, AIC unit 1020 can be set to represent no. 11 and no. 12. If the no. 11 is the best one, then the coupling phase is found.

Note that because AIC unit 1020 is not calibrated, the synthesized phase may differ significantly from the true channel phase. However, this proposed search technique can conservatively narrow down the search range without excluding unlikely phases too aggressively.

Referring to FIG. 10B, the following steps can be used during the search technique. Initially, AIC unit 1020 can be disabled by opening switch 1027. Switch 1028 can then be closed. At a Bluetooth hopping frequency $f_{BT}$, the WLAN Rx mixer 1031 can be set to a WLAN center frequency $f_{WLAN}$ such that $abs(f_{BT}-f_{WLAN}) \leq 8$ MHz. Note that a digital mixer at the WLAN Rx baseband can be used to down-convert the low-IF Bluetooth signal to DC and a 1 MHz BW LPF can be used to filter the down-sampled ADC outputs to measure the magnitude for AGC tuning (set the averaged magnitude to a target value agc_target_mag).

At this point, switch 1028 can be opened, VGA 1025B can be set to maximum gain, and VGA 1025A can be set to minimum gain to represent (1+0j). VGA 1021 can be adjusted such that WLAN Rx 1 MHz-LPF output power=agc_target_mag. Switch 1027 can then be closed.

In the first round of searching, VGA 1025B, 1025A and inverters 1024B, 1024A can be sequentially set to represent 1+0j, −1+0j, 0+j, and 0−j to measure their residual signal magnitudes. As shown in FIG. 10C, in each search round, three phases can be retained: the most likely one (with the minimum residual signal strength) and another two that are closest to the most likely one. In one embodiment, after 5 rounds of searching, an AIC setting that is closest to the coupling channel in phase can be determined.

If the residual signal strength is less than a threshold mag_aic_done, then searching can stop and the current AIC setting is fixed. In one embodiment, the threshold is determined based on the cancellation requirement. For example, if 20 dB cancellation is required, then the threshold can be set to agc_target_mag/10 (i.e. 1/10 in magnitude=−20 dB in power).

In one embodiment, if the residual signal strength is equal to or larger than a threshold mag_aic_done, then VGA 1021 can be sequentially set to +2/+1/−1/−2 dB, for example, to search for a better cancellation result. If the best setting does not satisfy the minimum cancellation requirement, then the hopping frequency can be dropped and the results from other frequencies can be used to interpolate it.

Figure 11A:
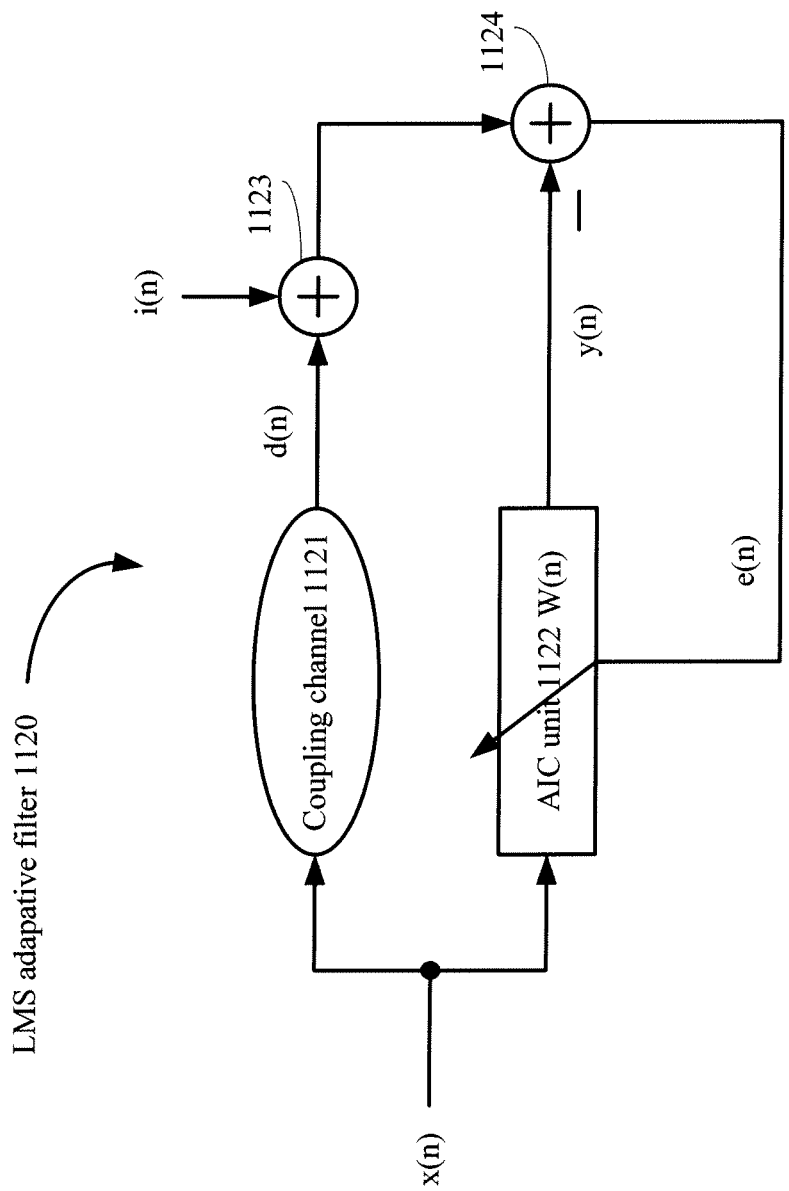
FIG. 11A illustrates an exemplary least mean square (LMS) adaptive filter that can be used to identify the response of an unknown system, i.e. a coupling channel.

To avoid calibrations, a least-mean-square (LMS) method can be used. FIG. 11A illustrates an exemplary LMS adaptive filter 1120 that can be used to identify the response of an unknown system, i.e. a coupling channel 1121. The following equations describe LMS adaptive filter 1120.

$$y(n) = W(n)x(n)$$
$$e(n) = d(n) + i(n) - y(n)$$
$$W(n+1) = W(n) + u_{step}e(n)x*(n)$$

where x(n) is an input signal to coupling channel 1121 and AIC unit 1122, d(n) is signal x(n) after traversing coupling channel 1121, y(n) is signal x(n) after being processed by AIC unit 1122, and e(n) is an output of adder 1004 that controls AIC unit 1122. Note that adder 1124 subtracts y(n) from a sum generated by an adder 1123 that receives d(n) and an interference signal i(n).

In one preferred embodiment, a block LMS (BLMS) technique can update active interference cancellation unit 1122 for each block of samples, thereby avoiding the possibility of too frequent interference cancellation adaptation. Notably, because coupling channel 1121 is expected to be slow-varying, the convergence behavior of the BLMS would be similar to LMS.

Assuming that n=kL+j in LMS adaptive filter 1120, the algorithm for AIC adaptation would be:

$$W(k+1) = W(k) + u\sum_{j=0}^{L-1} e(kL+j)x*(kL+j)$$

where k is the block index, L is the block size (i.e. the number of samples), u is the step size (which controls the speed of convergence). In one embodiment, the step size u can be adjusted based on the block size L, the word-lengths of e(n) and x(n), and the antenna isolation to guarantee a stable convergence within the limited time budget (e.g. 366·s for each hopping frequency).

As indicated in FIG. 11A, the LMS method can use x(n) to calculate the update factor $u_{step}e(n)x*(n)$. In one embodiment, the actual 8 MHz Bluetooth Tx baseband samples can be directly used as x(n). Note that using a lower rate x(n) can provide more cycles per sample to ease the serial arithmetic; however, this lower rate x(n) may also need longer ADC chunks to get sufficient number of samples for an accurate power estimate and thus reduce the maximum allowable adaptation times. Some mechanisms that can accelerate the LMS convergence are discussed below.

One advantage of the LMS method is its immunity against interference. Ideally, as long as the interference i(n) is uncorrelated to x(n), the LMS algorithm can converge toward an optimized setting by accumulating more samples for the update factor. In one embodiment, two LPFs (low pass filters) can be implemented to filter out the potential in-band interferences to stabilize the result: one LPF (8 MHz bandwidth) can be positioned before a 1/11 decimator (from 88 MHz to 8 MHz), and another LPF (1 MHz bandwidth) can be positioned after that decimator.

Figure 11B:
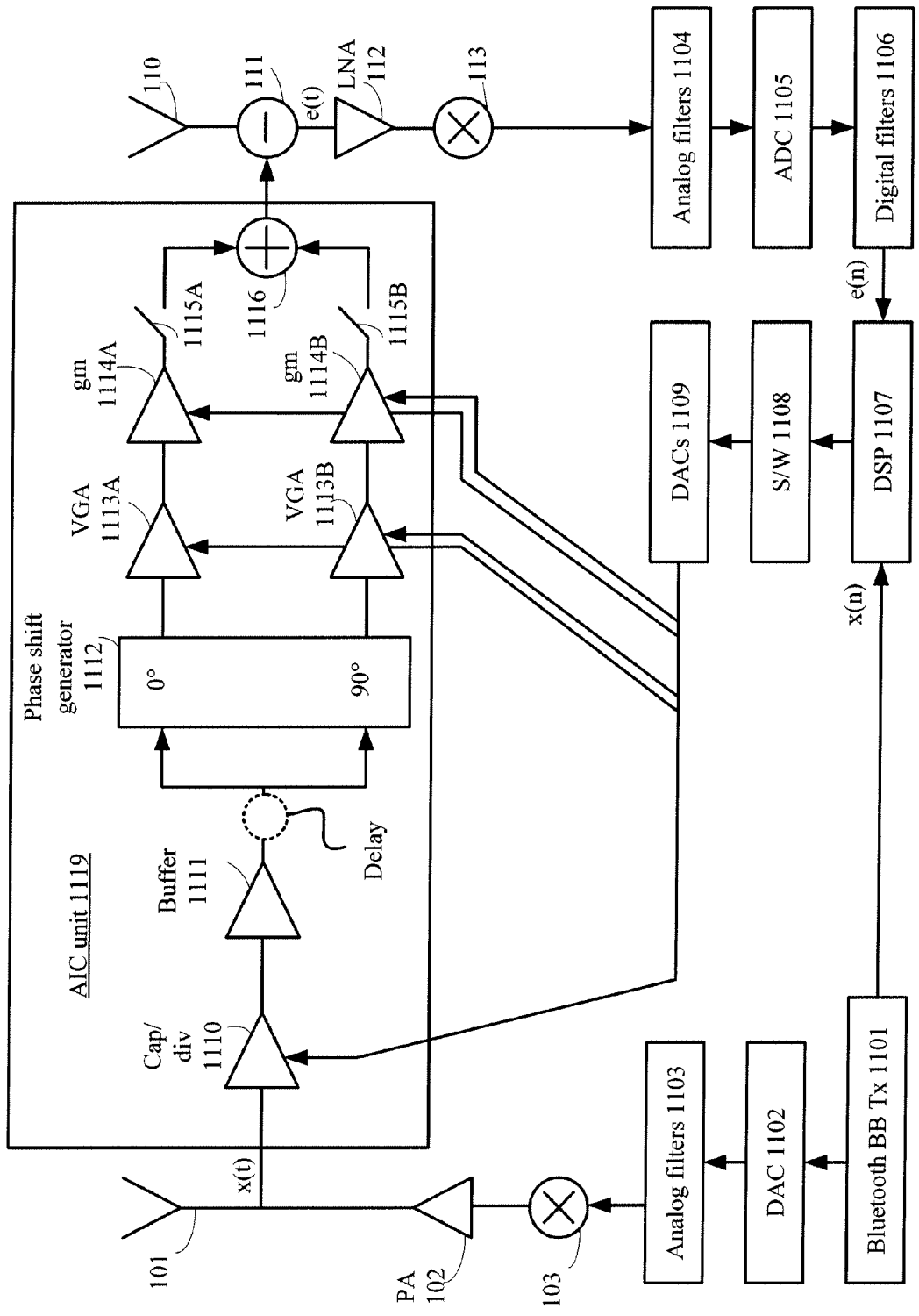
FIG. 11B illustrates an exemplary AIC unit to implement an LMS tuning of an interference conditioning.

FIG. 11B illustrates an exemplary AIC unit 1119 to implement an LMS technique. In this embodiment, AIC unit 1119 includes a capacitor divider 1110, which provides common mode gain attenuation. A buffer 1111 receives an output of capacitor divider 1110 and provides buffered signals to a phase shift generator 1112, which provides both 0° and 90 phase shifts. In one embodiment, a delay can be placed between buffer 1111 and phase shift generator 1112 to provide additional control. The outputs of phase shift generator 1112 are provided to VGAs 1113A and 1113B. Two gms (also called gm amplifiers or transconductance amplifiers) 1114A and 1114B receive the outputs of VGAs 1113A and 1113B, respectively, which are summed by adder 1116 when switches 1115A and 1115B are closed. The sum generated by adder 1116 is then subtracted from the incoming signal at antenna 110 using adder 111.

Note that the receive chain associated with antenna 110 can include the following components in series: adder 111, LNA 112, mixer 113, analog filters 1104 (e.g. the LPFs described above), an analog to digital converter 1105, digital filters 1106, a digital signal processor (DSP) 1107, software 1108, and DACs 1109. The transmit chain associated with antenna 101 can include the following components in series: a Bluetooth baseband transmitter 1101, a DAC 1102, analog filters 1103, a mixer 103, and a power amplifier 102. DSP 1107 can receive an output e(n) from digital filters 1106 as well as an output x(n) from Bluetooth baseband transmitter 1101. DACs 1109 can adjust capacitor divider 1110, VGAs 1113A and 1113B, and gms 1114A and 1114B.

In an operational system, the observed residual signal e(n) output by digital filters 1106 may not have the same phase as e(t). Similarly, the reference signal x(n) provided by Bluetooth baseband transmitter 1101 may also not have the same phase as x(t), which is output by buffer 1111. Therefore, the calculated AIC update factor e(n)x*(n) would be much different from e(t)x*(t), thereby making an LMS algorithm unable to converge. One approach that can advantageously eliminate phase calibration is to sequentially apply a different phase increment $\phi$ (e.g. 0:2pi/11:2pi) to each block of e(n) to correct the LMS phase during the digital down-conversion. After the adaptation coefficient e(n)x*(n)exp(j$\phi$) is roughly aligned to e(t)x*(t), which means the AIC adaptation is approximately converging, an obvious signal drop at the ADC output (in particular e(n)) can be observed in DSP 1107 due to the effective cancellation. This phase increment $\phi$ can be kept for the following digital down-conversion and continue the LMS adaptation.

In the system embodiment shown in FIG. 11B, a timing difference can also arise between e(n) and x(n). Note that if the timing difference is too significant, there would be no correlation between x(n) and e(n), and the adaptation coefficient e(n)x*(n) would be ineffective. However, because the Bluetooth baseband transmit signal is narrowband, if the uncertainty of delay is less than 100 ns, then delay calibration (through correlation) is not performed in one embodiment.

In another embodiment, an additional correlator can be implemented at the WLAN receiver (e.g. in DSP 1107) to correlate e(n) (with switch 1115B off, switch 1115A on, minimum VGA 1113B, and maximum VGA 1113A) with x(n) to directly estimate this phase difference. This correlator can also be used to calibrate the timing difference between x(n) and e(n).

In one embodiment, to facilitate convergence within a limited time budget, if the LMS does not achieve a target cancellation (e.g. 12 dB) after a predetermined number of adaptations (e.g. 4 times), then the current LMS phase can be changed to another one.

In another embodiment, to facilitate convergence within a limited time budget, an LMS step size adjustment can be used to accelerate the LMS phase search. Specifically, an isolation value can be estimated to adjust the LMS step size. Notably, if the AIC unit gain can be set to the isolation level at the first adaptation, an immediate determination can be made whether the current LMS phase is appropriate by observing the residual signal strength e(n). If the cancellation is ineffective, then the current LMS phase can be immediately changed to another one. Note that to achieve a stable convergence, the LMS phase cannot significantly differ from the realistic one.

Figure 12A:
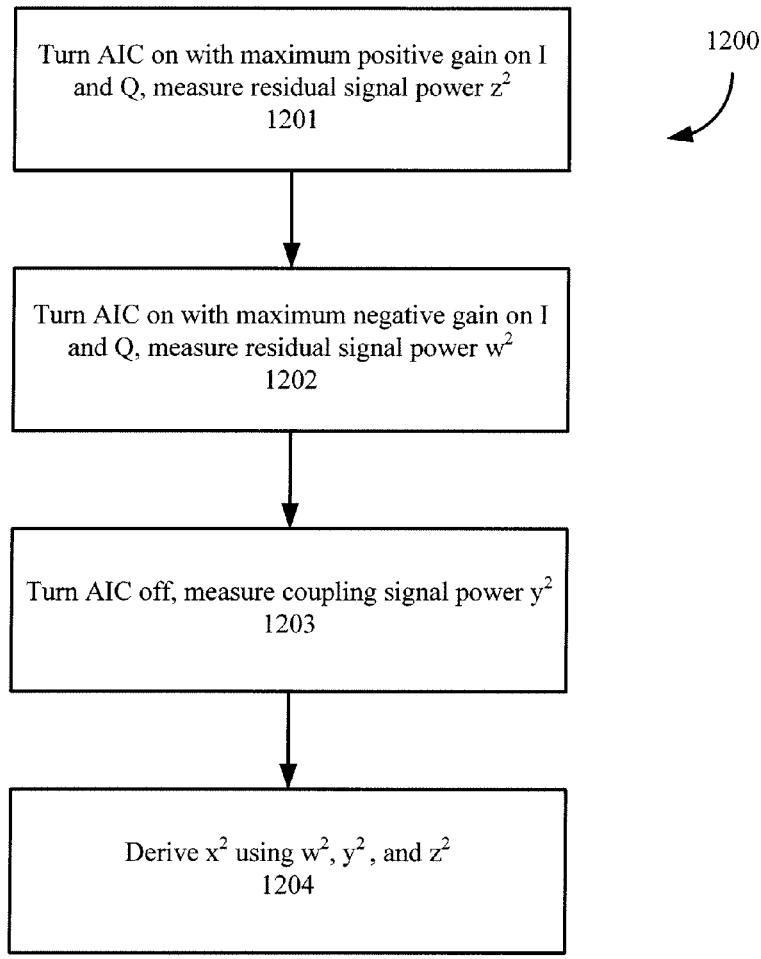
FIGS. 12A and 12B illustrate a technique to estimate antenna isolation.
Figure 12B:
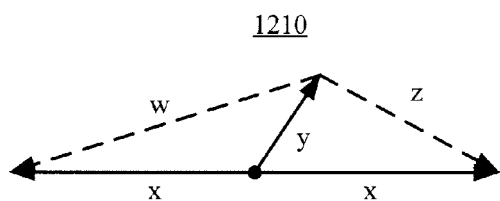

FIG. 12A illustrates a technique 1200 to estimate the isolation without an additional calibration path. Technique 1200 is based on a relationship 1210, which is shown in FIG. 12B. In relationship 1210, $x^2=(w^2+z^2)/2-y^2$, wherein "x" is the cancellation signal strength, "y" is the coupling signal strength, and "w" and "z" are residual signal strengths.

Referring back to FIG. 12A, step 1201 can turn on AIC unit 1120 (FIG. 11) (i.e. close switches 1115A and 1115B) with maximum positive gains on 0° and 90° paths (e.g. VGAs 1113A and 1113B as well as gms 1114A and 1114B). At this point, the residual signal power $z^2$ can be measured. Note that the signal power=digital power−Rx gains. In step 1202, with AIC unit 1120 still turned on, the maximum negative gains can be applied to both 0° and 90° paths. At this point, the residual signal power $w^2$ can be measured.

In step 1203, AIC unit 1120 can be turned off by opening switches 1115A and 1115B. At this point, the coupling signal power $y^2$ can be measured. Step 1204 can derive $x^2$ use the equation $x^2=(w^2+z^2)/2-y^2$. Because the nominal AIC gain value corresponding to x is now known, the isolation value corresponding to y can also be derived.

Figure 13:
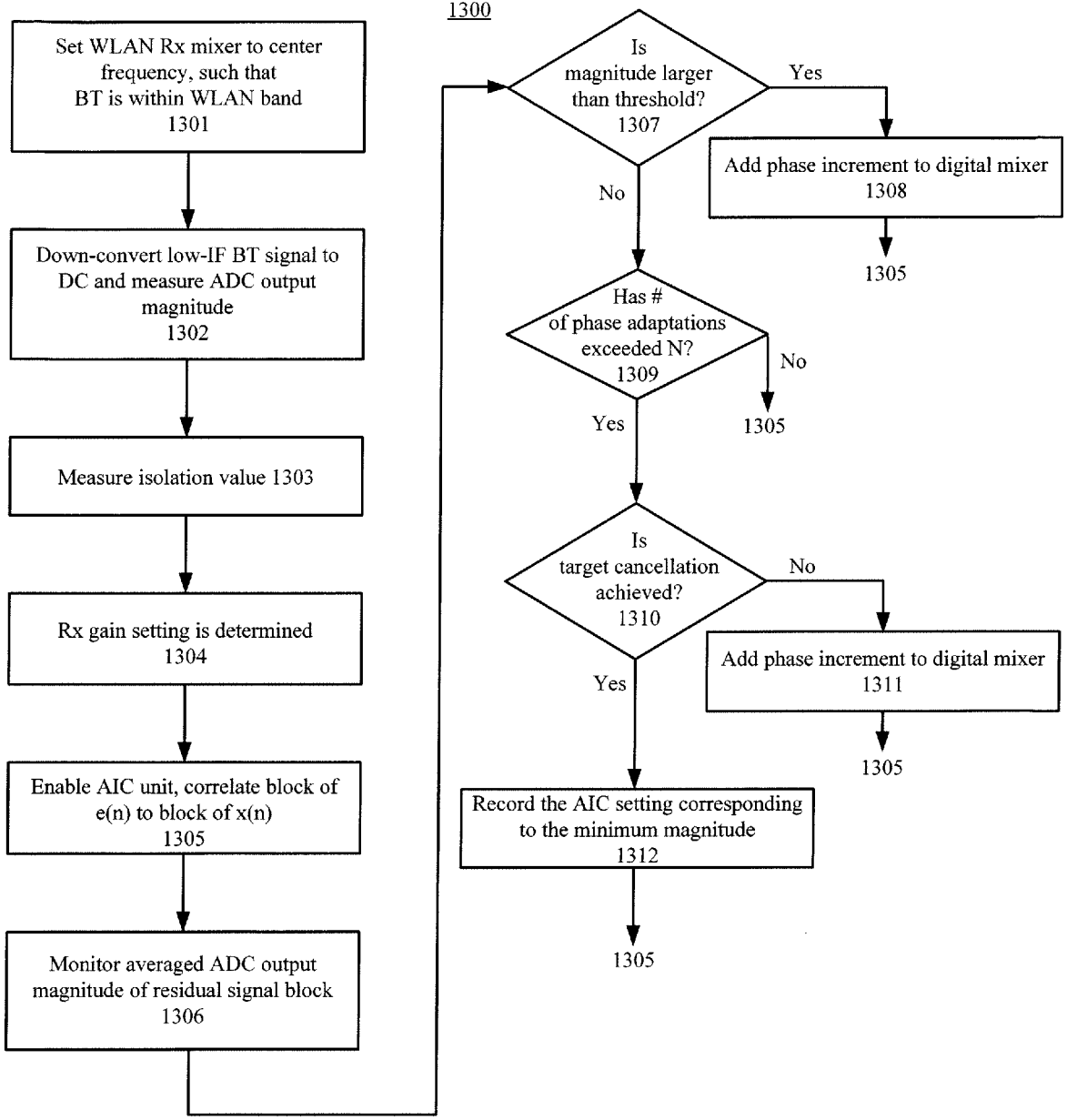
FIG. 13 illustrates an exemplary technique for achieving a target cancellation.

FIG. 13 illustrates an exemplary technique 1300 for achieving a target cancellation. In step 1301, at a Bluetooth hopping frequency $f_{BT}$, the WLAN receiver mixer is set to a WLAN center frequency $f_{WLAN}$ such that Bluetooth is within the WLAN band. Step 1302 can use a digital mixer at the WLAN receiver baseband to continually down-convert the low-IF Bluetooth signal to DC and measure the ADC output magnitude for AGC tuning. The averaged ADC output magnitude can be designated agc_target_mag.

Step 1303 can estimate the isolation value as described above in reference to FIGS. 12A and 12B. Step 1304 can disable the AIC unit and wait for the AGC to settle. At this point, the WLAN receiver gain is ready to be used the following steps.

In step 1305, after enabling the AIC unit, a block of e(n) can be correlated to the corresponding block of x(n)

$$\left(\text{i.e. } u\sum_{j=0}^{L-1} e(kL+j)x*(kL+j)\right)$$

to calculate the AIC adaptation coefficient. Step 1306 can continuously monitor the averaged ADC output magnitude of each residual signal block. If the magnitude is equal to or smaller than the threshold (which means the AIC adaptation is effective), then the technique can return to step 1305 for the next AIC adaptation. If the magnitude is larger than a threshold (which means the AIC setting does not converge), as measured by step 1307, then step 1308 can add a phase increment to the digital mixer for the following down-conversion to correct the LMS phase.

Step 1309 can determine whether the number of phase adaptations has exceeded a predetermined number N. If not, then the technique can return to step 1305. If so, then step 1310 can determine whether a target cancellation (e.g. 12 dB) has been achieved. If not, then step 1311 can add another phase increment to the digital mixer to for the following down-conversion to correct the LMS phase. Note that the phase increment of step 1311 may be the same as that in step 1308. A larger phase increment can accelerate the convergence, but the convergence might be less stable. An exemplary phase increment for steps 1311 and 1308 may be 45 degrees.

In one embodiment, during steps 1301-1312, the AIC gain setting that corresponds to the minimum residual signal magnitude can be recorded as the best setting. If the magnitude is smaller than a threshold mag_aic_done, then the channel has been identified. The threshold mag_aic_done can be roughly determined based on the required cancellation. For example, if 20 dB cancellation is required, then the threshold can be set to agc_target_mag/10.

Figure 14:
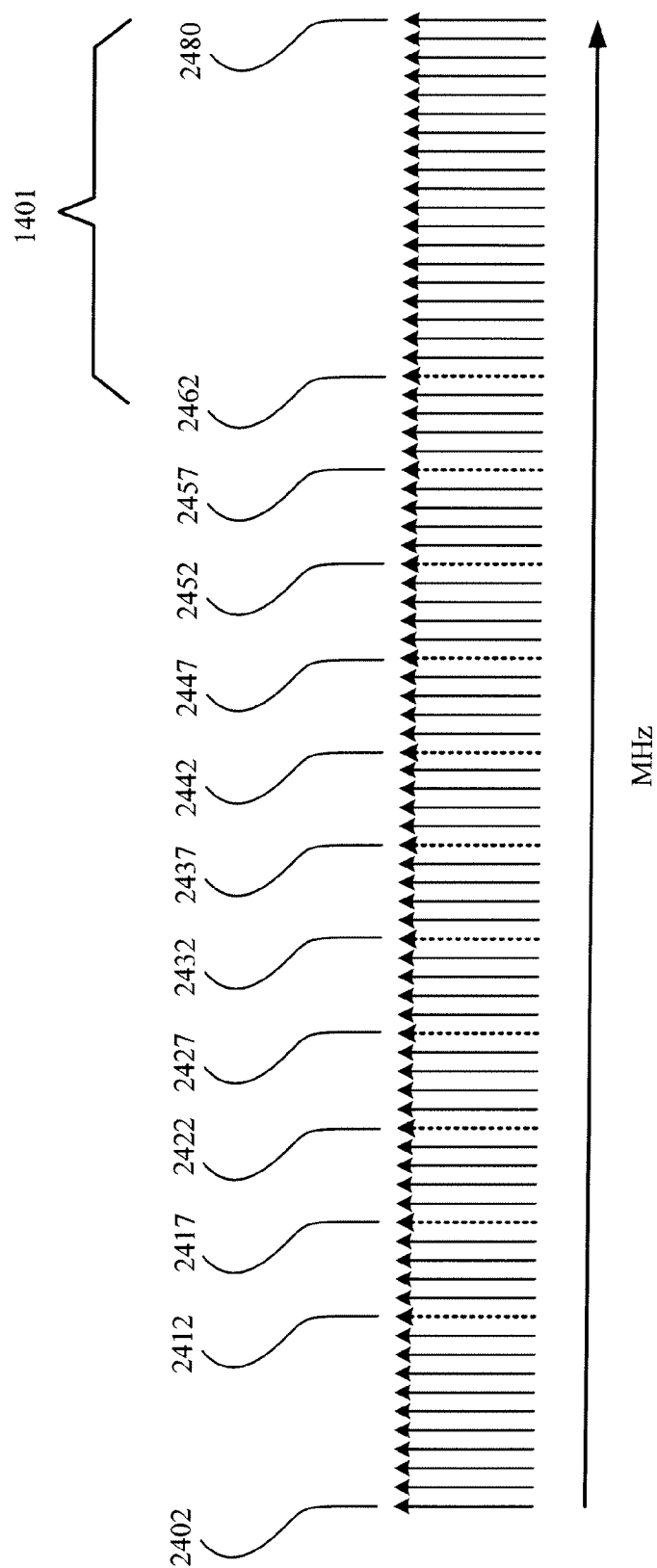
FIG. 14 illustrates a plurality of WLAN and Bluetooth center frequencies.

Referring to FIG. 14, note that the WLAN center frequencies occur between 2412 MHz and 2462 MHz at 5 MHz intervals (indicated by dotted arrows). In contrast, the Bluetooth center frequencies occur between 2402 MHz and 2480 MHz at k MHz, wherein k=0~78. As shown in FIG. 14, the maximum difference 1401 between a WLAN center frequency and a Bluetooth center frequency is 2480−2462=18 MHz. In one embodiment, the WLAN receiver can perform in a high-throughput mode (e.g. 40 MHz) during calibration. In this case, the WLAN receiver can use 2422 MHz and 2462 MHz to cover all hopping frequencies.

Figure 15:
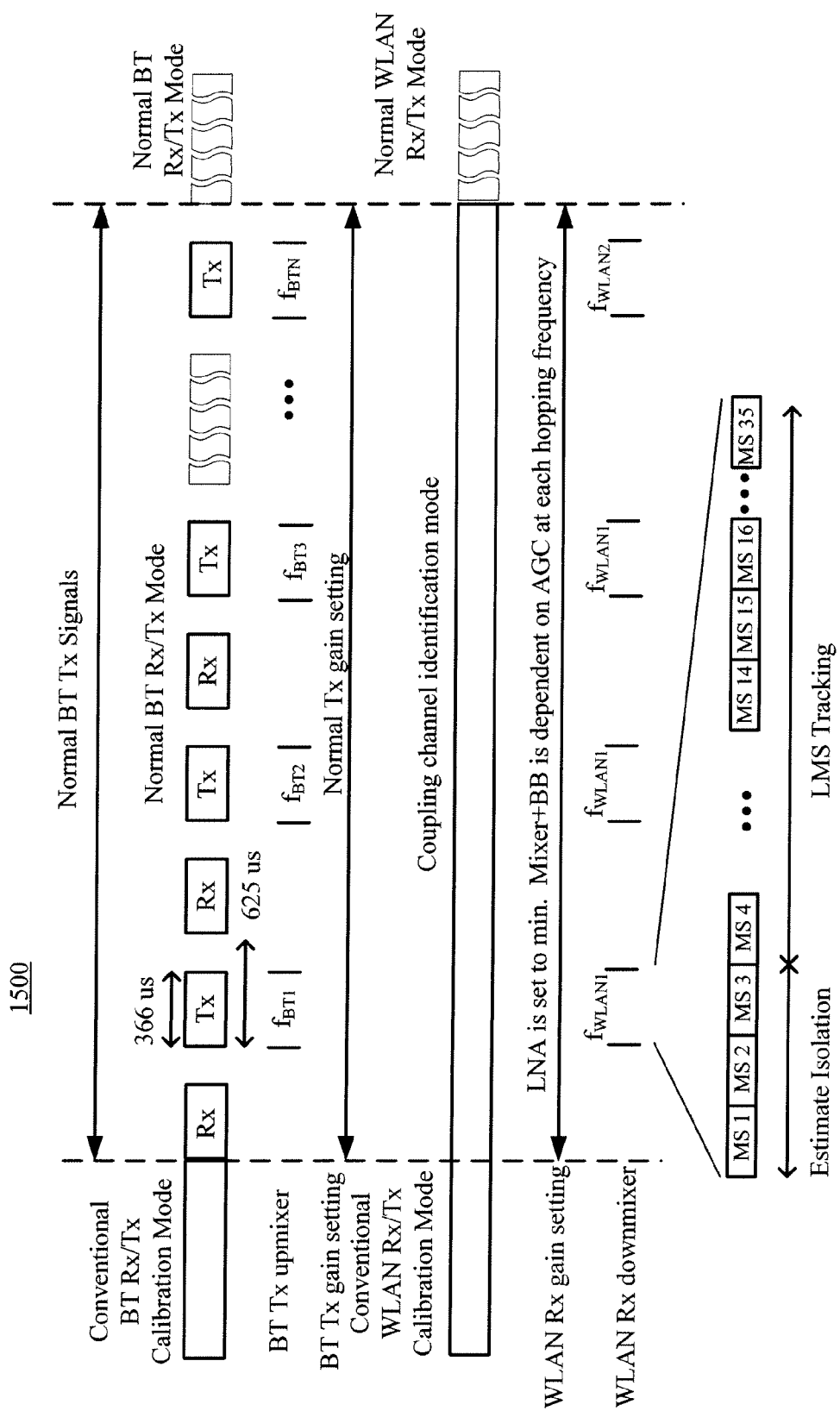
FIG. 15 illustrates an exemplary timing diagram for the LMS technique.

FIG. 15 illustrates an exemplary timing diagram 1500 for the LMS technique described above. Note that conventional calibrations of the Bluetooth and WLAN can be performed before the coupling channel identification mode. Estimating the isolation as well as the LMS tracking can advantageously occur within the period used for normal transmission in Bluetooth, i.e. 366 μs. In one embodiment, each WLAN measurement (MS1-MS35) can be performed in 10 μs (thereby providing 880 samples at 88 MHz). Normal WLAN operation can follow the coupling channel identification mode. Note that estimating the isolation and LMS tracking can be performed for each Bluetooth hopping frequency or for multiple Bluetooth hopping frequencies and interpolation performed for intermediate Bluetooth hopping frequencies. Measured (and interpolated) values can be stored in a table and then accessed during AIC.

Figure 16:
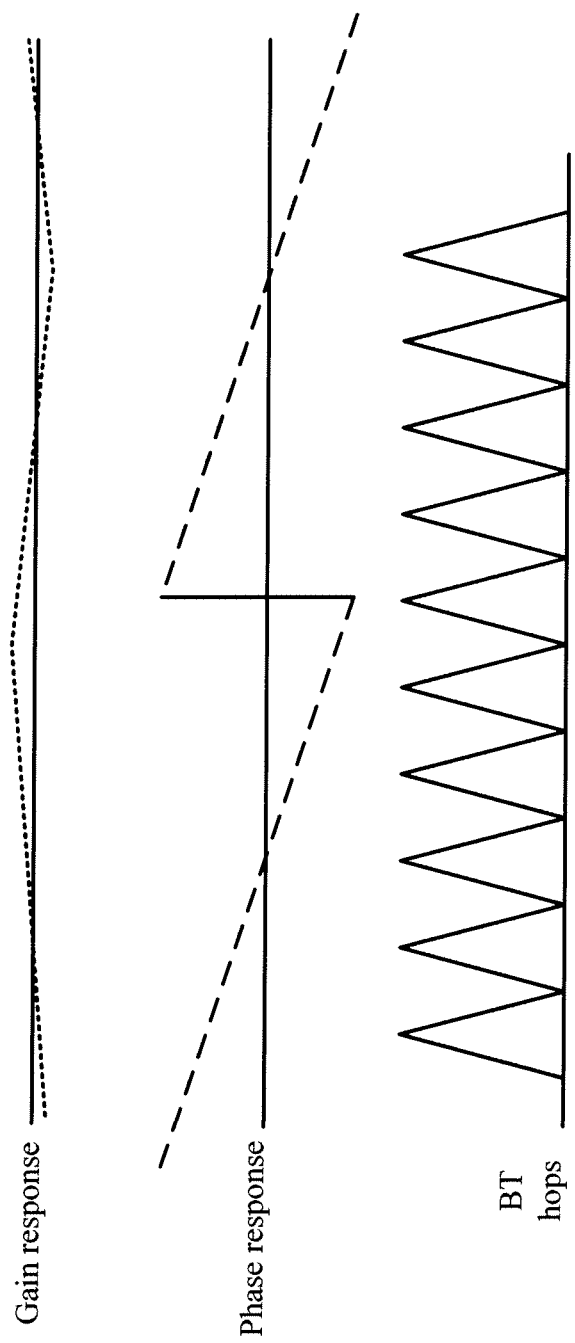
FIG. 16 illustrates using channel identification results from multiple Bluetooth hops to calibrate timing delay.

Note that some timing delay will be present in the channel coupling the Bluetooth transmitter and the WLAN receiver. This timing delay can be calibrated to optimize the AIC. As illustrated in FIG. 16, after getting several channel identification results using multiple Bluetooth hops, their phase responses can be used to predict the phase slope. At this point, the slope value can be translated to a timing delay estimate, which can be used for timing the gain response. In one embodiment, this timing delay calibration can be done in software.

In one embodiment, a determination can be made whether main lobe or the side lobe cancellation is more critical to the performance of the Bluetooth/WLAN combination device. The decision can be based on the joint consideration of the antenna isolation, the Bluetooth spectrum shape, the frequency separation, and the timing difference between the coupling path and the cancellation path. In one embodiment, main lobe cancellation is preferred unless the isolation (which can be discerned based on the variable gain settings) is large enough.

The goal of the tuning is to completely remove interference and achieve a signal quality the same as without interference or perhaps even better than without interference if noise can also be removed in the interference cancellation process. Tuning criteria metrics can include measuring (1) total signal power at the point of interest (which can avoid overloading of analog circuits), (2) signal-to-noise ratio (SNR) or EVM (which can reduce in-band noise), or (3) an interference signal in the received waveform, and then cross-correlating between the interference signal and the received waveform. Note that the representation of the signal used for cross-correlation could be obtained from down-converting of the interference signal obtained by an antenna or coupler as described above, or from a generated representation of the interference signal. Such generated reference might include intentional distortion that would represent the effect of the power amplifier in use.

Note that interference can cause multiple mechanisms for signal quality degradation. For example, interference can cause saturation of the front end from the main lobe as well as degradation of the SNR of the desired signal from side lobes of the interfering signal, both of which adversely affect signal quality. In one embodiment, to address these multiple mechanisms, a separate tuning can be done for each impairment (and thus separate interference conditionings).

In another embodiment, separate interference conditionings are performed, but only one is active at any time (and thus only one interference conditioning needs to be tuned). The active interference conditioning can be adaptively chosen to cancel the dominant impairment under a current operation condition (e.g. coupling channel gain, interference type and levels, or desired signal level). For example, in the Bluetooth and WLAN co-existence system, the dominate impairment may be determined by the knowledge of the Bluetooth signal level, the coupling level, and the WLAN signal level. Alternatively, the dominate impairment may be determined by the knowledge of the main lobe saturating the LNA when the Bluetooth signal is large and the WLAN signal is small. Yet in another example, the dominate impairment may be determined by the knowledge of the in-band noise when the WLAN receiver is not saturated, but Bluetooth is close to frequency of the WLAN.

In yet another embodiment, only one interference conditioning can be tuned to cancel the dominate impairment under the current operation condition (including coupling channel, interference type and levels, and desired signal level). In yet another embodiment, only one interference conditioning may be tuned to achieve the overall minimum degradation to desired signal quality.

Similarly, there may be several interference sources present. Under these conditions, a single interference sensor can be deployed to receive primarily the dominant interference, and the interference conditioning can strive to remove that dominant source. Alternatively, several interference sensors can be used to obtain multiple interference references. Because the different interference sources are likely to have different coupling coefficients to the signal path of the desired waveform, multiple signal conditioning paths (one for each interference source to be cancelled) can be used. Each of these independent interference conditioning paths can be tuned as described above.

Note that the existence of interference can be detected using one or more criteria. In one embodiment, interference can be detected using a peak detector saturation count. For example, one or more peak detectors can be inserted in the receiver chain (e.g. after the LNA). A comparator can compare the outputs of the peak detectors with a comparing threshold (e.g. programmed by a DAC) to indicate very large signals. The statistics of the presence of very large signals can be used to indicate interference. Such statistics can include counting the number of saturations over a time period, especially after the AGC is locked, the WLAN desired packet reception has started, and the LNA is not set at high gain settings.

In another embodiment, spectrum analysis can be performed to detect interference. For example, the received signal can be transformed to the frequency domain, thereby allowing a narrow band large interference to be identified. In yet another embodiment, EVM can be used to detect interference. For example, the receiver can report the EVM per bin for a WLAN OFDM signal, wherein a few bins showing very bad EVM can identity a narrow band large interference. In yet another embodiment, either the SNR or the PER can be used to identify interference. In yet another embodiment, co-existence signaling between co-exiting radios can be used to identify interference. Note that co-existence signaling can be at the software/application level, the MAC level or PHY level, and may include a time window for transmission. In yet another embodiment, a direct correlation between the presumed interference signal and the received signal can be used to detect interference. Notably, any of the above interference detection methods can be used as feedback to adjust the signal conditioning to achieve the best possible interference cancellation.

In one embodiment, the AIC unit can down-convert an interference signal using a mixer. One reason to down-convert the interference signal is to capture the effect of the phase noise present in the interference signal. However, to have the correct representation of the phase noise, the mixer must have phase noise that tracks that of the mixer in the desired signal receive path. If the interference transmitting local oscillator (LO) were to be used for this down conversion, the phase noise would cancel, and the phase noise effects of both the transmitter and receiver would be lost, such that cancellation in the baseband would not include the effects of phase noise. It can also be seen that if all mixers in the system were driven by LOs that are locked together such that they have substantially the same phase noise, then the phase noise in all paths would cancel naturally, and there would be no concern about the phase noise.

Although variable gain amplifiers are described above for conditioning the magnitude and phase of the interference, variable delay lines can also be used. At low frequencies, an analog delay may be implemented by approximately the ideal exponential transfer function, $\exp(-\tau s)$, with $(1-\tau s/2)/(1+\tau s/2)$ using standard operational amplifier techniques.

Various methods can be considered for tracking the varying channel and trigger recalibration within a reasonable time period to ensure good cancellation performance. For example, in one embodiment, an RF buffer amplifier can be added after the LNA, which allows routing of an amplified signal to the Bluetooth receiver. At this point, the Bluetooth receiver can be used to process the residual signal to track the coupling channel. Notably, this method is transparent to the WLAN normal operation. In another embodiment, the WLAN Rx can periodically be put into a calibration mode to keep AIC up-to-date.

In yet another embodiment, an RF peak detector can be used to monitor the residual power. This RF peak detector can be configured to provide sufficient dynamic range to cover possible isolation dynamics. To this end, an RF amplifier can be placed between the LNA output and the peak detector input. Note that this estimation result can be sensitive to a strong blocker or interference because there is no filter at RF.

Figure 17:
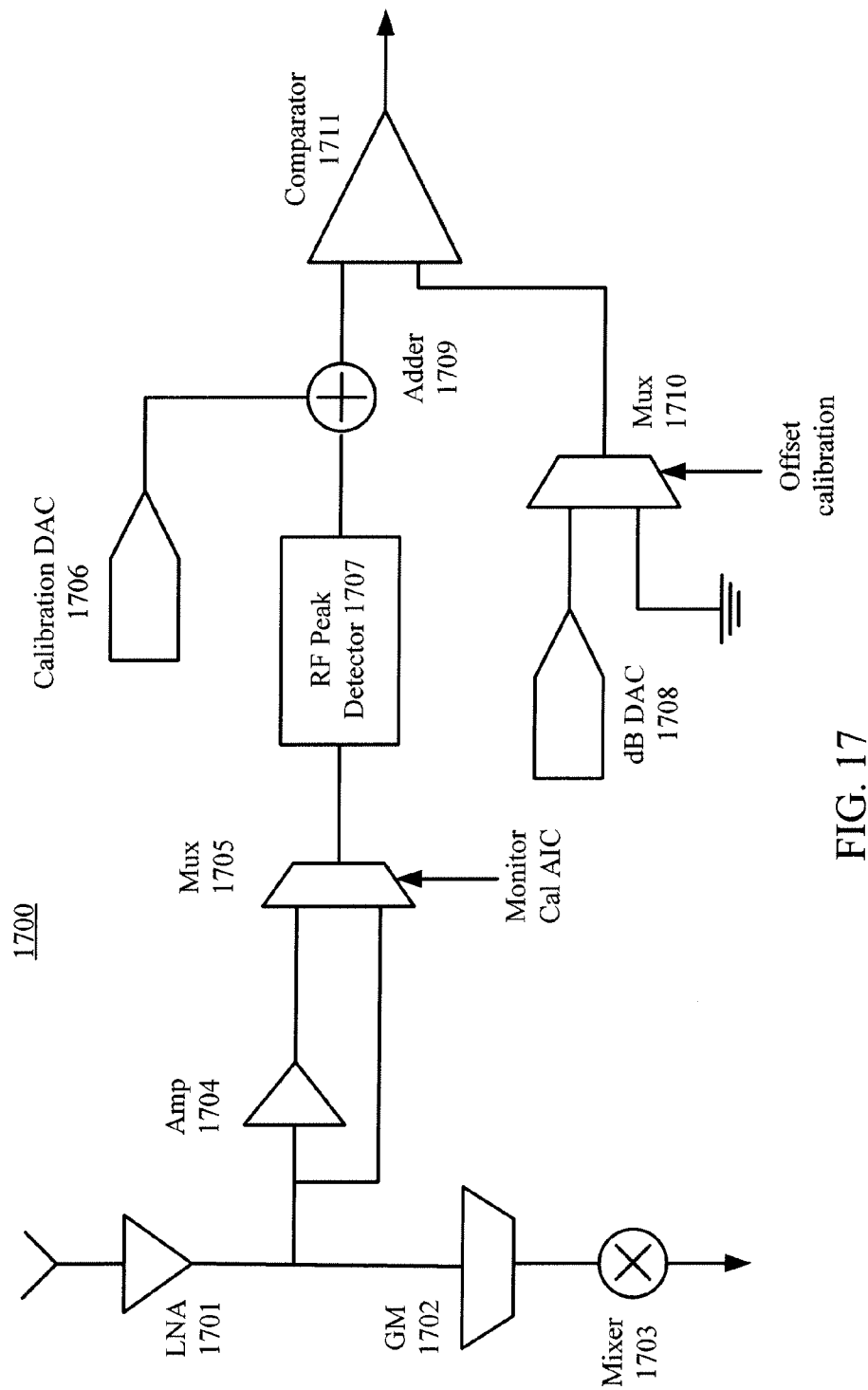
FIG. 17 illustrates an exemplary RF peak detector circuit that can be coupled to a WLAN receiver.

FIG. 17 illustrates a configuration 1700 including an amplifier 1704 and an RF peak detector 1707 (also referenced herein as a peak detector) used for AIC monitoring. In this embodiment, components of a receive path include an LNA 1701, a GM 1702, and a mixer 1703. As shown in FIG. 17, amplifier 1704 is coupled between an output of LNA 1701 and a multiplexer 1705. Multiplexer 1705 can select between the output of LNA 1701 and the amplified output of amplifier 1704 based on a monitor calibration AIC control signal (which activates/deactivates the AIC calibration mode). Specifically, when AIC calibration is activated, the amplified signal from amplifier 1704 is selected and when AIC calibration is deactivated (i.e. normal mode), the output of LNA 1701 is selected.

The output of multiplexer 1705 can be provided to RF envelope 1707 for peak detection. An adder 1709 can subtract a calibration DAC signal 1706 from the output of RF envelope detector 1707 to account for DC offset removal. A multiplexer 1710 can select between ground and a dB DAC signal 1708 (which is one dB step and accounts for magnitude threshold setting). A comparator 1711 will output I/O if the output level of the adder 1709 is greater/smaller than the magnitude threshold. With the knowledge of the gain setting of LNA 1701, the setting value of dB DAC 1708, and the output statistics of comparator 1711, the power level of the received signal strength can be estimated. Thus, in configuration 1700, the power difference with and without AIC can be estimated to determine the effectiveness of AIC.

In one embodiment, if RF envelope detector 1707 peak detector is required to accurately determine the effectiveness of AIC under 40 dB isolation scenarios, amplifier 1704 should be able to configured to at least 24 dB (i.e. 4 dBm (maximum Bluetooth Tx power)+1 dB (Tx antenna matching gain)−40 dB (isolation)−20 dB (cancellation)+27 dB (Rx antenna matching gain+maximum LNA gain)+X (amplifier 1704)>−4 dBm (minimum sensible power of the peak detector)→X>24 dB).

In one embodiment, when the WLAN is inactive (e.g. in a search mode) at the start of a Bluetooth transmission, the WLAN can set the AIC unit to its minimum gain (i.e. the setting without cancellation). With this first setting, configuration 1700 can estimate the input power of LNA 1701 to determine a pwr_1 value. Then, the WLAN can load the main-lobe cancellation AIC setting (i.e. the setting with cancellation). With this second setting, configuration 1700 can estimate the input power of LNA 1701 to determine a pwr_2 value. The power difference between pwr_1 and pwr_2 can then be calculated to determine whether the cancellation is effective.

In one embodiment, to determine whether cancellation is effective, the following method can be followed. Initially, the gain of LNA 1701 and the dB DAC 1708 can be set to their respective minimum values. For each measurement, one period of the comparator 1711's outputs are summed to get an indicator. Then, the gain of LNA 1701 can be increased until the indicator is greater than a first predetermined threshold. At this point, the dB DAC signal can be increased until the indicator is less than a second predetermined threshold (which means the output of adder 1709 is less than the current dB DAC signal). The LNA gain index and the dB DAC index for pwr_1 and pwr_2 can be stored in memory (not shown). The effectiveness of the cancellation can be calculated by determining the ratio between prw_1 and pwr_2. In one embodiment, a ratio above 20 dB can be considered to be effective.

In one embodiment, the following software procedures can be performed during AIC calibration. To accelerate the completion of calibration, dummy Bluetooth frames can be inserted during calibration of the AIC. Note that the software of the WLAN can decide when AIC calibration is performed and then send messages (including the dummy frame start indicator and Bluetooth hopping frequency indicator) to the Bluetooth software. When the Bluetooth medium is free, the Bluetooth software can schedule the dummy Bluetooth Tx frames. In one embodiment, the length of each dummy frame is a single-slot. Note that the start frequency can be the lowest frequency in the band used by Bluetooth, the next frequency can be the current frequency plus a delta frequency. The last frequency can be the highest frequency of the band used by Bluetooth (in coexistence with WLAN).

At this point, the AIC hardware (described above) can perform calibration on all the dummy Bluetooth Tx frames. Once the WLAN AIC hardware assembles the calibration results for the programmed number of frequencies, the WLAN AIC hardware can send an interrupt signal to the WLAN software. At this point, the WLAN software can send messages (including a stop dummy frame indicator) to the Bluetooth software. The WLAN software can then read the calibration results, calculate an appropriate AIC setting, program the WLAN baseband AIC hardware, and enable the WLAN baseband AIC hardware. Note that during normal operation, at the Bluetooth Tx, the WLAN baseband AIC hardware can manage the RF AIC unit.

AIC management during normal operation may include the following prohibitions: do not turn on the AIC if the Bluetooth transmitter is off; do not change the AIC state during a WLAN transmitter; the AIC can only be in either "on" or "standby" state during a WLAN transmitter (to prevent switching the AIC unit on/off during a Bluetooth transmitter); do not switch the AIC on/off during a Bluetooth transmitter because it may cause a phase jump in the Bluetooth transmitter signal; do not switch the AIC on/off during a WLAN receiver because it may causes a phase jump on the WLAN receiver; if the coupling Bluetooth is expected to be weaker than a threshold (either due to low Bluetooth transmitter power or high antenna isolation), do not turn on the AIC during WLAN search; and do not switch the AIC on/off during a Bluetooth receiver.

Figure 18:
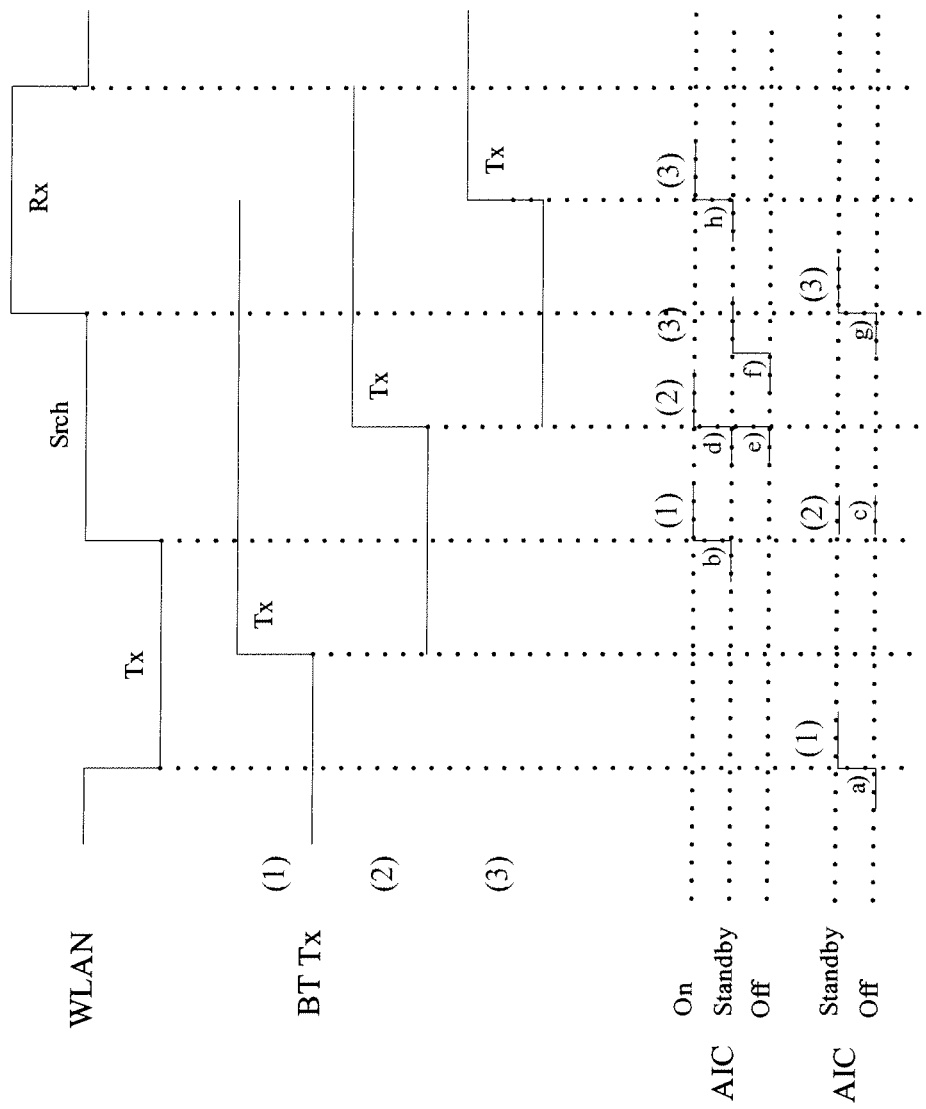
FIGS. 18-20 illustrate various states of a combination WLAN and Bluetooth device as well as corresponding AIC conditions.

FIG. 18 illustrates various start states of a combination WLAN and Bluetooth device as well as corresponding AIC conditions.
1-a: (bt_idle & wlan_tx_start)
1-b: (bt_in_tx & wlan_tx_end & btpwr_cond)
2-c: (idle&cfg_stdby_cond[0])
2-d: (bt_tx_start & wlan_in_search & btpwr_cond) originate from the case of cfg_stby_cond[0]=1
2-e: (bt_tx_start & wlan_in_search & btpwr_cond)
3-f: (bt_rx_start & wlan_in_search)
3-g: (bt_idle & wlan_rx_start & wlan pwr_cond)
3-h: (bt_tx_start & wlan_in_rx & pwr_cond)

Figure 19:
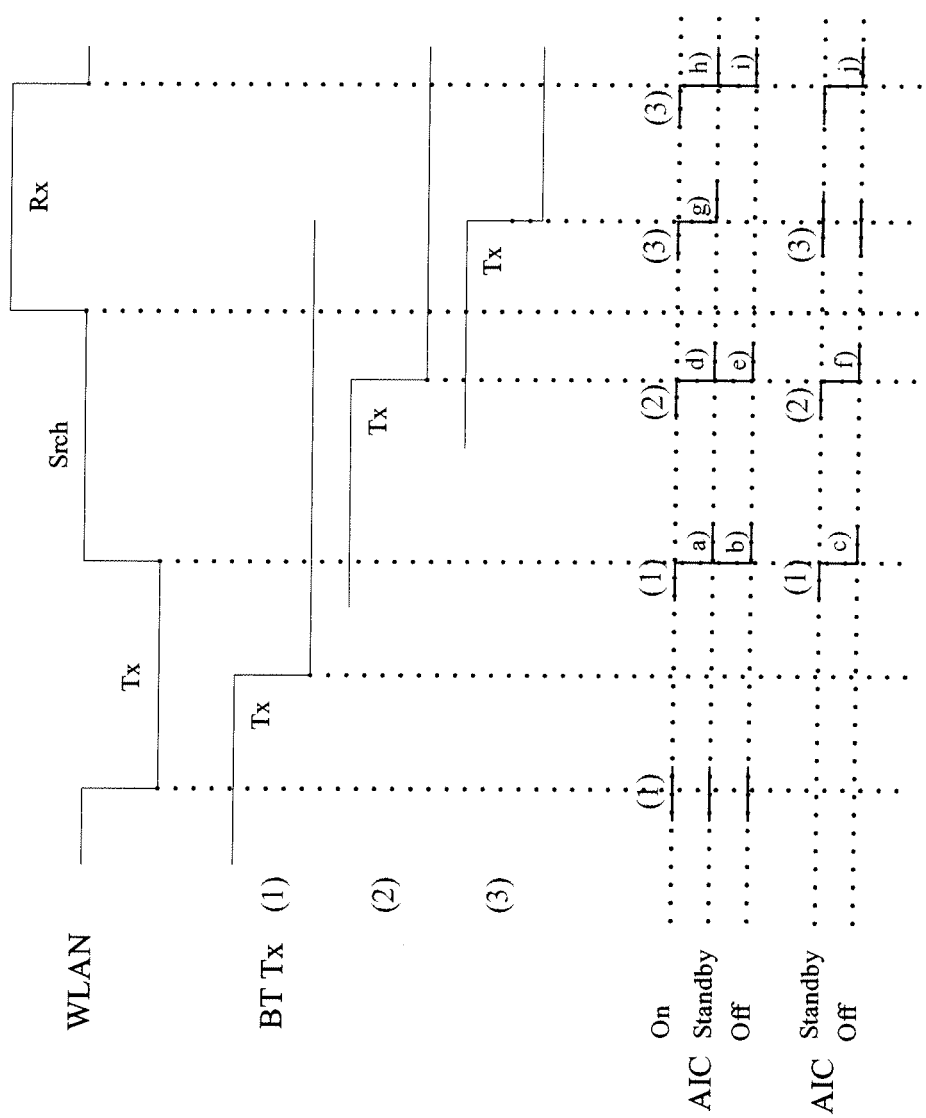

FIG. 19 illustrates various end states of a combination WLAN and Bluetooth device as well as corresponding AIC conditions.
1-a, 2-d, 3-h: (idle&cfg_stdby_cond[0])
1-b, 2-e, 3-i: (idle&-cfg_stdby_cond[0])
1-c, 2-f, 3-j: (idle&-cfg_stdby_cond[0])
3-g: (bt_tx_end&wlan_in_rx&aic_stdby_cond[1])

These conditions are defined in further detail below.
bt_idle: (~bt_in_tx)&(~bt_in_rx|aic_cfg_bt_idle)
wlan_idle: (~wlan_in_tx)&(~wlan_in_rx)
idle: bt_idle&wlanidle
aic_cfg_bt_idle:
   0: (~bt_in_tx)&(~bt_in_rx)
   1: ~bt_in_tx
bt_pwr_cond:
   (bt_tx_pwr>aic_min_bt_txpwr+true_ant_iso_est) wlan_pwr_cond:
   (wlan_rssi>aic_min_rssi)&(wlan_rssi<aic_max_rssi)
pwr_cond: bt_pwr_cond&wlan_pwr_cond
cfg_stby_cond[0]:
   0: allow aic_off when idle
   1: stay in aic_standby even while idle
cfg_stby_cond[1]
   0: deny aic_on→aic_standby during wlan_in_rx
   1: allow aic_on→aic_standby during wlan_in_rx In one embodiment and described in further detail in reference to FIG. 20, the AIC can be monitored only when wlan_idle=1 during normal operation. If the WLAN is in idle mode or the WLAN just finishes its transmission, and the AIC state machine decides to let AIC on, the AIC can be temporarily switched to the "standby" mode and then sent back to the "on" mode to check the effectiveness of the AIC setting. If most of the monitored Bluetooth frequencies fail on check, then AIC recalibration can be triggered to update the AIC setting.

Figure 20:
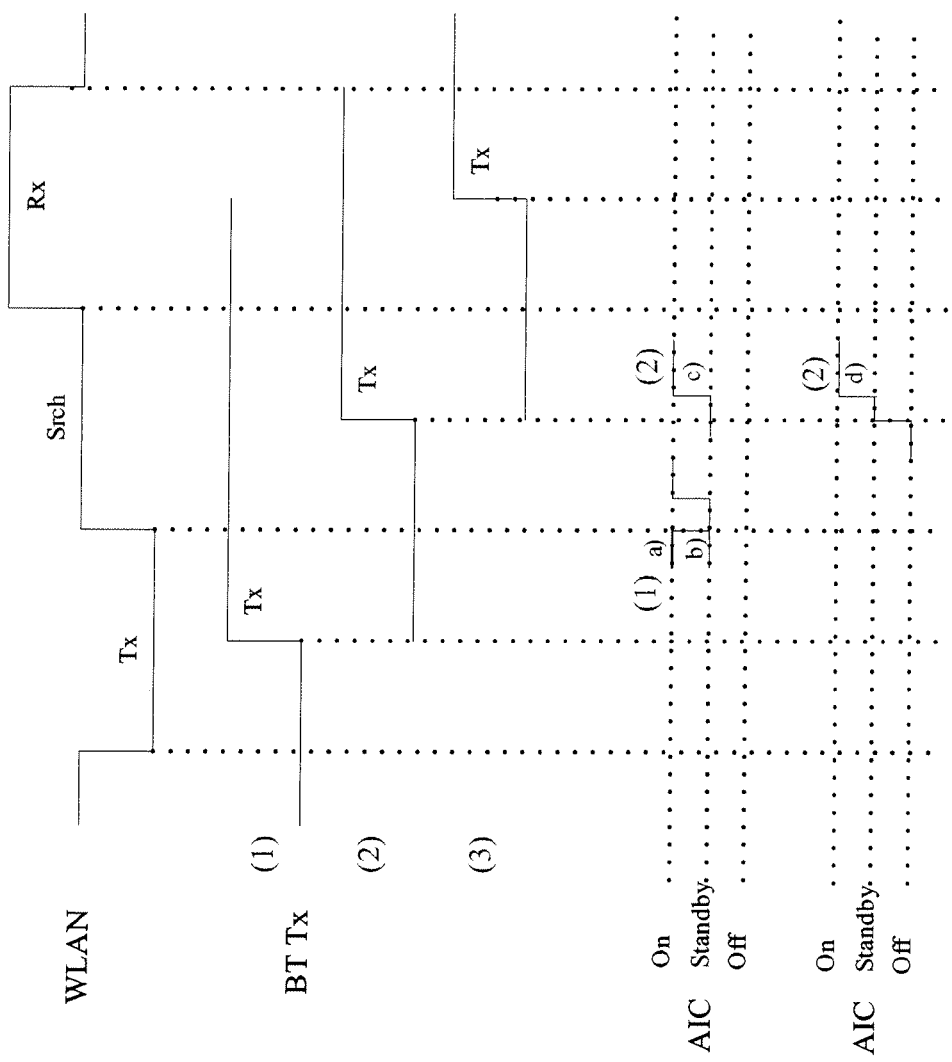

FIG. 20 illustrates various states of a combination WLAN and Bluetooth device during AIC monitoring as well as corresponding AIC conditions.
1-a: (bt_in_tx & wlan_tx_end)
1-b: (bt_in_tx & wlan_tx_end & bt_pwr_cond)
2-c: (bt_tx_start & wlan_in_search & bt_pwr_cond) originate from the case of aic_stby_cond[0]=1
2-d: (bt_tx_start & wlan_in_search & bt_pwr_cond)

In summary, the WLAN software can set a timer to periodically enable monitoring of the AIC. Once the AIC monitoring is enabled, a predefined number of successive Bluetooth hops can be monitored. For each monitored Bluetooth hop, the WLAN baseband can configure the RF peak detector and set the AIC unit from the mode AICstandby to the mode AICon. If the monitored Bluetooth frequency fails on the check, then that frequency can be marked as stale. If the number of stale count exceeds a threshold, then AIC recalibration can be triggered to update the AIC setting.

Although illustrative embodiments of the invention have been described in detail herein with reference to the accompanying figures, the embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of performing active interference cancellation in a system including multiple radios, wherein signals from a first radio are received as interference at a second radio, the method comprising:
   providing interference conditioning, which manipulates an interference reference of the interference at the first radio to approximate an interference observed at the second radio, the first radio coupled to the second radio;
   tuning the interference conditioning using a least mean square (LMS) technique; and
   removing the interference based on the tuning,
   wherein the tuning the interference conditioning using the LMS technique is performed for a block of samples from the first radio, and wherein the tuning includes adjusting a step size according to a block size.

2. The method of claim 1, wherein the tuning includes sequentially applying a different phase increment to each block.

3. The method of claim 1, wherein the tuning includes estimating an antenna isolation value to adjust the step size.

4. A method of performing active interference cancellation in a system including multiple radios, wherein signals from a first radio are received as interference at a second radio, the method comprising:
   providing interference conditioning, which manipulates an interference reference of the interference at the first radio to approximate an interference observed at the second radio, the first radio coupled to the second radio;
   tuning the interference conditioning using a least mean square (LMS) technique; and
   removing the interference based on the tuning,
   wherein the tuning the interference conditioning using the LMS technique includes determining whether a current phase is effective by observing a residual signal strength of one or more digital filters at the second radio.

5. A method of performing active interference cancellation in a system including multiple radios, wherein signals from a first radio are received as interference at a second radio, the method comprising:
   providing interference conditioning, which manipulates an interference reference of the interference at the first radio to approximate an interference observed at the second radio, the first radio coupled to the second radio;
   tuning the interference conditioning using a least mean square (LMS) technique; and
   removing the interference based on the tuning,
   wherein the tuning the interference conditioning using the LMS technique includes deriving a cancellation signal strength based on two residual signal strengths and a coupling signal strength.

6. A method of performing active interference cancellation in a system including multiple radios, wherein signals from a first radio are received as interference at a second radio, the method comprising:
   providing interference conditioning, which manipulates an interference reference of the interference at the first radio to approximate an interference observed at the second radio, the first radio coupled to the second radio;
   tuning the interference conditioning based on observation of a signal after interference cancellation; and
   removing the interference based on the tuning,
   wherein the tuning includes adjusting a rate at which conditioning is changed according to a block size.

7. The method of claim 6, wherein the tuning includes sequentially applying a different phase increment to each block.

8. The method of claim 6, wherein the tuning includes estimating an antenna isolation value to adjust the rate.

9. A method of performing active interference cancellation in a system including multiple radios, wherein signals from a first radio are received as interference at a second radio, the method comprising:
   providing interference conditioning, which manipulates an interference reference of the interference at the first radio to approximate an interference observed at the second radio, the first radio coupled to the second radio;
   tuning the interference conditioning based on observation of a signal after interference cancellation; and
   removing the interference based on the tuning,
   wherein the tuning includes deriving a cancellation signal strength based on two residual signal strengths and a coupling signal strength.

10. A wireless communication system, comprising:
    a first radio having a first transmission path;
    a second radio communicatively coupled to the first radio, the second radio having a receive path that receives signals from the first transmission path as interference, the receive path including a least mean square (LMS) adaptive filter; and
    an active interference cancellation (AIC) unit coupled between the first radio and the second radio that manipulates an interference reference of the interference at the first radio to approximate an interference observed at the second radio;
    wherein the LMS adaptive filter tunes the AIC unit for each block of samples received from the first transmission path, and
    wherein the AIC unit removes the interference based on tuning received from the LMS adaptive filter.

11. The wireless communication system of claim 10, wherein the LMS adaptive filter tunes the AIC unit relative to a step size that is based on a block size.

12. The wireless communication system of claim 11, wherein the LMS adaptive filter tunes the AIC unit by sequentially applying a different phase increment to each block.

13. The wireless communication system of claim 11, wherein the LMS adaptive filter tunes the AIC unit by estimating an antenna isolation value to adjust the step size.

14. The wireless communication system of claim 11, wherein the LMS adaptive filter tunes the AIC unit by determining whether a current phase is effective by observing a residual signal strength of one or more digital filters at the second radio.

15. The wireless communication system of claim 10, wherein the LMS adaptive filter tunes the AIC unit by deriving a cancellation signal strength based on two residual signal strengths and a coupling signal strength.

16. The wireless communication system of claim 10, wherein the first transmission path includes a Bluetooth transmitter and the second radio receives wireless local area network (WLAN) signals.

17. A wireless communication system, comprising:
    a first radio having a first transmission path;
    a second radio communicatively coupled to the first radio, the second radio having a receive path that receives signals from the first transmission path as interference, the receive path including tuning circuitry, the tuning circuitry generating tuning signals; and an active interference cancellation (AIC) unit coupled between the first radio and the second radio that provides interference conditioning that manipulates an interference reference of the interference at the first radio to approximate an interference observed at the second radio, the AIC unit receiving the tuning signals;

wherein the tuning circuitry tunes the interference conditioning at the AIC unit based on observation of a signal after interference cancellation, wherein the AIC unit adjusts a rate at which the tuning circuitry changes the interference conditioning based on a block size, and wherein the AIC unit removes the interference based on the tuning signals.

18. The wireless communication system of claim 17, wherein the tuning circuitry sequentially applies a different phase increment to each block.

19. The wireless communication system of claim 17, wherein the tuning circuitry estimates an antenna isolation value to adjust the rate.

20. The wireless communication system of claim 17, wherein the first transmission path includes a Bluetooth transmitter and the second radio receives wireless local area network (WLAN) signals.

21. A wireless communication system, comprising:
a first radio having a first transmission path;
a second radio communicatively coupled to the first radio, the second radio having a receive path that receives signals from the first transmission path as interference, the receive path including tuning circuitry, the tuning circuitry generating tuning signals; and
an active interference cancellation (AIC) unit coupled between the first radio and the second radio that provides interference conditioning that manipulates an interference reference of the interference at the first radio to approximate an interference observed at the second radio, the AIC unit receiving the tuning signals;
wherein the tuning circuitry tunes the interference conditioning in the AIC unit based on observation of a signal after interference cancellation,
wherein the AIC unit removes the interference based on the tuning signals, and
wherein the tuning circuitry tunes the interference conditioning by deriving a cancellation signal strength based on two residual signal strengths and a coupling signal strength.

22. The wireless communication system of claim 21, wherein the first transmission path includes a Bluetooth transmitter and the second radio receives wireless local area network (WLAN) signals.

* * * * *